(12) United States Patent
Lin

(10) Patent No.: US 10,719,726 B2
(45) Date of Patent: Jul. 21, 2020

(54) FACIAL RECOGNITION-BASED AUTHENTICATION

(71) Applicant: Alibaba Group Holding Limited, George Town (KY)

(72) Inventor: Junsui Lin, Shenzhen (CN)

(73) Assignee: Alibaba Group Holding Limited (KY)

( * ) Notice: Subject to any disclaimer, the term of this patent is extended or adjusted under 35 U.S.C. 154(b) by 125 days.

(21) Appl. No.: 15/716,056

(22) Filed: Sep. 26, 2017

(65) Prior Publication Data

US 2018/0096212 A1  Apr. 5, 2018

(30) Foreign Application Priority Data

Sep. 30, 2016 (CN) .......................... 2016 1 0873804

(51) Int. Cl.
| | | |
|---|---|---|
| G06K 9/00 | (2006.01) | |
| G06F 16/583 | (2019.01) | |
| H04N 5/232 | (2006.01) | |
| G06F 21/32 | (2013.01) | |
| G06K 9/20 | (2006.01) | |
| G06K 9/58 | (2006.01) | |
| G06F 3/147 | (2006.01) | |
| G06K 9/46 | (2006.01) | |

(52) U.S. Cl.
CPC ..... *G06K 9/00906* (2013.01); *G06F 16/5838* (2019.01); *G06F 21/32* (2013.01); *G06K 9/00261* (2013.01); *G06K 9/00268* (2013.01); *G06K 9/00288* (2013.01); *G06K 9/2054* (2013.01); *G06K 9/58* (2013.01); *H04N 5/23219* (2013.01); *H04N 5/23293* (2013.01); *H04N 5/232939* (2018.08); *G06F 3/147* (2013.01); *G06K 9/4652* (2013.01); *G06K 9/4661* (2013.01); *G09G 2358/00* (2013.01)

(58) Field of Classification Search
CPC ............ G06K 9/00899; G06K 9/00906; G06F 21/31–32
See application file for complete search history.

(56) References Cited

U.S. PATENT DOCUMENTS 5,386,103 A * 1/1995 DeBan ............... G06K 9/00275
                                                      235/379
5,842,194 A 11/1998 Arbuckle
(Continued)

FOREIGN PATENT DOCUMENTS

WO  WO2015122789  8/2015
WO  2016077578  5/2016

OTHER PUBLICATIONS http://web.archive.org/web/20170824135142/http://open.youtu.qq.com/. Aug. 24, 2017.

*Primary Examiner* — Ponnoreay Pich
(74) *Attorney, Agent, or Firm* — Van Pelt, Yi & James LLP

(57) ABSTRACT

Facial recognition-based authentication comprises obtaining a first image of a target object, updating projection information associated with a display by a display device, obtaining a second image of the target object, the second image being an image of the target object after the projection information is updated, obtaining an image difference data based at least in part on the first image and the second image, and determining whether the target object is a virtual object based at least in part on the image difference data.

28 Claims, 11 Drawing Sheets

(56) References Cited

U.S. PATENT DOCUMENTS

| | | | |
|---|---|---|---|
| 6,128,398 A * | 10/2000 | Kuperstein | G06K 9/00288 |
| | | | 382/116 |
| 6,697,502 B2 | 2/2004 | Luo | |
| 6,785,406 B1 | 8/2004 | Kamada | |
| 7,430,315 B2 | 9/2008 | Yang | |
| 7,561,791 B2 | 7/2009 | Kakiuchi | |
| 8,270,603 B1 | 9/2012 | Durst | |
| 9,202,105 B1 * | 12/2015 | Wang | G06Q 20/4014 |
| 2002/0136435 A1 | 9/2002 | Prokoski | |
| 2008/0294907 A1 | 11/2008 | Hively | |
| 2010/0299747 A1 * | 11/2010 | Hamilton, II | G06F 21/335 |
| | | | 726/19 |
| 2013/0015946 A1 * | 1/2013 | Lau | G07C 9/00 |
| | | | 340/5.2 |
| 2014/0226000 A1 | 8/2014 | Vilcovsky | |
| 2014/0283014 A1 * | 9/2014 | Tse | G06F 21/32 |
| | | | 726/19 |
| 2015/0125048 A1 | 5/2015 | Ikenoue | |
| 2017/0185760 A1 * | 6/2017 | Wilder | G06F 21/36 |

\* cited by examiner

FACIAL RECOGNITION-BASED AUTHENTICATION

CROSS REFERENCE TO OTHER APPLICATIONS

This application claims priority to People's Republic of China Patent Application No. 201610873804.1 entitled A TERMINAL DEVICE, A SMART PHONE, AND A FACIAL RECOGNITION-BASED AUTHENTICATION METHOD AND SYSTEM, filed Sep. 30, 2016 which is incorporated herein by reference for all purposes.

FIELD OF THE INVENTION

The present invention relates to a field of identity verification. In particular, the present application relates to a terminal device, a smart phone, method, and system for facial recognition-based authentication.

BACKGROUND OF THE INVENTION

Biometrics is a way of authenticating personal identities by combining computers, optical, acoustical, and biological sensors, the principles of biostatistics, and other high-tech methods and using the inherent physiological characteristics (e.g., fingerprints, voice prints, faces, irises, etc.) of the human body as well as behavioral characteristics (e.g., handwriting, voice, gait, etc.) to identify individuals. Facial recognition technology has the advantages over other biometrics of being accurate, non-invasive, and in real time. Therefore, it is widely applied in various sectors of society, such as video monitoring, facial recognition-based attendance checking, and identity authentication systems.

In the field of identity authentication, particularly in the field of facial recognition-based identity authentication, the related art generally authenticates identities according to the following two techniques:

In the first technique, a facial image recognition-based identity authentication system carries out recognition and authentication by using a camera to capture facial images of users. In the facial recognition process, the system extracts characteristic information about the facial images. However, a photograph of a person and the facial images acquired by a video camera have almost the same characteristics. Thus, it is possible to simulate the effects of an actual person and cheat the authentication system by subjecting the photograph of a face to rotation, flipping, bending, and other such operations in front of the image-capturing device. Therefore, a facial image recognition-based identity authentication system is vulnerable to attacks by photographs of legitimate users and three-dimensional models of legitimate users.

In the second technique, in a facial image recognition-based identity authentication system, a human face within an image frame undergoes facial recognition, characteristic point extraction, facial characteristic point comparison, action recognition, etc. A living, real person is assessed primarily using the forms of facial expressive activity. The user is prompted to perform one or more actions (such as nodding or shaking the head, eye-blinking, or opening the mouth), and the system receives the corresponding actions performed by the user. The person's actions are computed and analyzed using the consecutive images that were taken. Specifically, real-time images are shot of a user with a video camera in order to acquire facial images. Representative characteristic points are extracted from the facial images, and these points include, but are not limited to, the nose, the eyebrows, the mouth, and other such characteristics. Methods such as rule-based methods or machine learning are then applied to the consecutive changes in the characteristic points of the consecutive, multi-frame images so as to assess whether there is a certain action (including, but not limited to: nodding or shaking the head, eye-blinking, or opening the mouth). Thereupon, the system assesses the correctness of the user's action and thus determines whether the real-time images correspond to a real person. Such a facial image recognition-based identity authentication system is subject to the following three forms of attack:

1. Video playback attack: actions are simulated by using video images of appropriate actions recorded in advance, and in this way the facial live recognition system is attacked.

2. Consecutive picture attack: actions are simulated by playing consecutive image slides, and in this way the facial live recognition system is attacked.

3. Facial action software simulation attack: a video playback attack and facial action software simulation attack acquire photographs of a legitimate user. The images of head-nodding, shaking, eye-blinking, and other such actions are synthesized through software simulation, and in this way the facial live recognition system is attacked.

An effective solution is needed to address the problem because existing live recognition-based authentication systems are still vulnerable to video or image attacks in which illegitimate users make use of the simulated actions of legitimate users described above.

BRIEF DESCRIPTION OF THE DRAWINGS

Various embodiments of the invention are disclosed in the following detailed description and the accompanying drawings.

The drawings described here are intended to further the understanding of the present invention and form a part of the present application. The exemplary embodiments of the present invention and the descriptions thereof are intended to explain the present invention and do not constitute inappropriate limitation of the present invention. Among the drawings.

DETAILED DESCRIPTION

Figure 1:
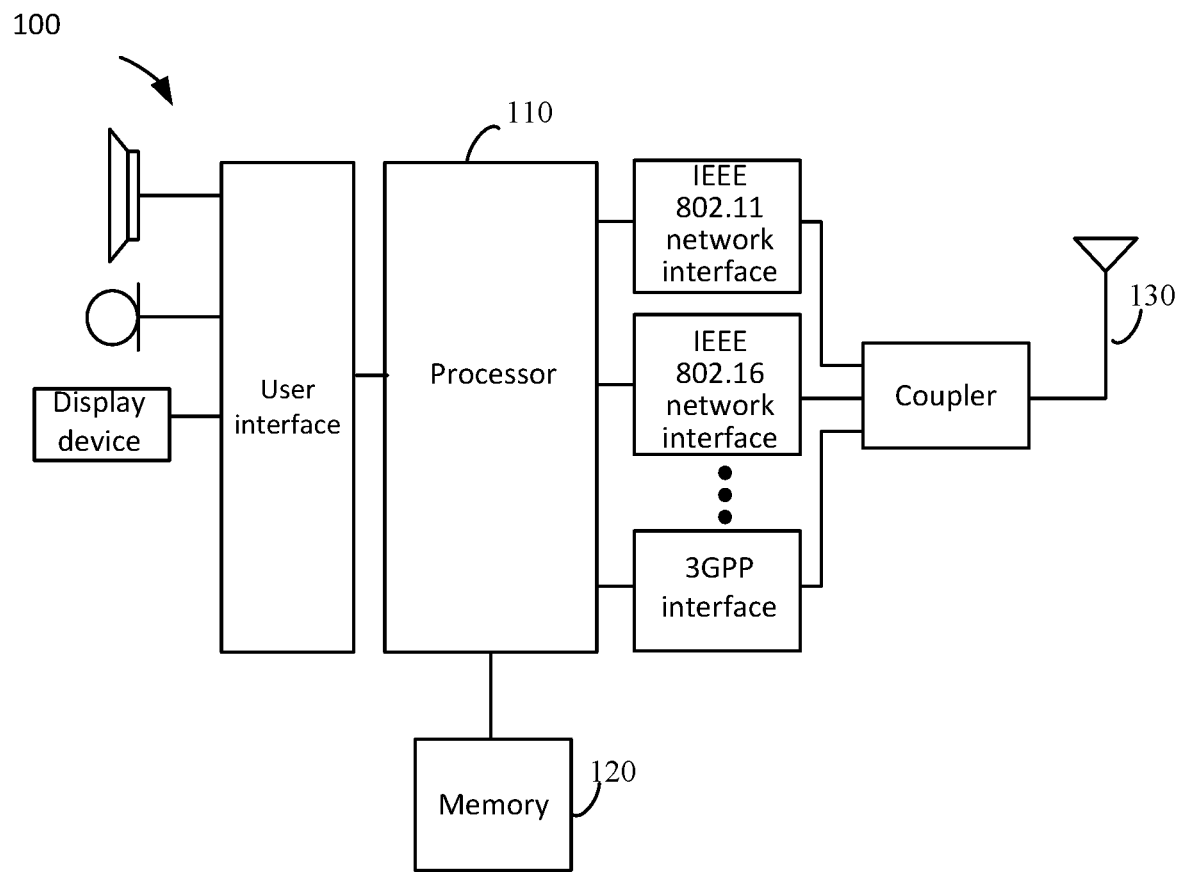
FIG. 1 is a structural block diagram of a terminal for a facial recognition-based authentication according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So that persons skilled in the art should have a better understanding of the technical schemes (techniques) of the present invention, the technical schemes in embodiments of the present invention are described clearly and completely in light of the drawings of the embodiments of the present invention. Obviously, the embodiments described are only some of the embodiments of the present invention and are not all the embodiments. All other embodiments that are obtained by persons with ordinary skill in the art on the basis of embodiments in the present invention should, so long as no additional creative effort is expended, fall within the scope of protection of the present invention.

Please note that the terms "first," "second," and so on in the description and claims of the present invention and in the drawings described above are for differentiating between similar objects and do not have to be for describing specific sequences or chronological orders. It should be understood that data used in this way is interchangeable under appropriate circumstances so that present invention embodiments described here may be implemented according to sequences other than those in drawings or descriptions here. In addition, the terms "comprising" or "having" and any variations thereof are intended to be non-exclusive. For example, processes, methods, systems, products, or equipment containing a series of steps or units need not be limited to those steps or units that are clearly listed, but may also include other steps or units that were not clearly listed or that are intrinsic to these processes, methods, products, or equipment.

Some of the terms that will appear in the process of describing various embodiments of the present application are applicable to the following explanation:

Video device: a device having functions such as video capturing and still-image capturing (e.g., a video camera, a smart phone, a tablet, etc.). After images are captured through a lens, a light-sensing component circuit and control component internal to the video device process and convert the images to digital signals recognizable by a terminal device. The image can be restored by software after the images are communicated to the terminal device (e.g., via a parallel port, USB, Bluetooth, WiFi, etc.).

Target object: any object from which image information can be acquired through a video device. The target object can be a real object or a virtual object.

Image: a photograph, picture, or video of a target object acquired by a video device. In various embodiments described in this specification, the first images correspond to images of target objects acquired by a video device prior to modification of projection information, and the second images correspond to images of target objects acquired by video device after modification of projection information.

Projection information: information for projecting onto a target object to thereby cause a reflection from the target object. Projection information can include content (e.g., text, picture, etc.) displayed on a projection device (e.g., a display screen) and/or display parameters (e.g., color, brightness, etc.) of a projection device. Projection information can be updated by updating the content displayed on (or otherwise output from) a projection device or updating the display parameters of a projection device. Projection information can include at least one of the following: projection brightness, projection color, and projection graphics (e.g., content being displayed such as a user interface, a video, an image, etc.).

Virtual object: a photograph of a real object (e.g., a substantive object such as a person's face, etc.), a three-dimensional model (e.g., a wax model), video, slides of consecutive pictures, or images synthesized from photograph-based software simulations and including real object actions.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, vehicle-mounted mobile stations, or the like. A terminal can run various operating systems.

A terminal can have various input/output modules. For example, a terminal can have a touchscreen or other display, one or more sensors, a microphone via which sound input (e.g., speech of a user) can be input, a camera, a mouse or other external input device connected thereto, etc.

FIG. 1 is a structural block diagram of a terminal for a facial recognition-based authentication according to various embodiments of the present application.

Referring to FIG. 1, terminal 100 for facial recognition-based authentication is provided. Terminal 100 can be implemented in connection with terminal 200 of FIG. 2, system 300 of FIG. 3, smartphone 900 of FIG. 9, and/or computer terminal 1000 of FIG. 10. Terminal 100 can implement, at least in part, process 400 of FIG. 4, process 600 of FIG. 6, process 700 of FIG. 7, and/or process 800 of FIG. 8.

According to various embodiments, methods for facial recognition-based authentication can be implemented in a computer device, a mobile device, or similar operating means.

Terminal 100 can be a mobile device. As illustrated in FIG. 1, terminal 100 includes one or more processors 110, memory 120, and communication modules 130. Processors 110 include, for example, processing means such as microprocessors (MCU) or programmable logic devices (FPGA). Memory 120 is configured to store data, including instructions that when executed by processors 110 implement a method for facial recognition-based authentication. Communication module 130 is configured to perform communication functions, including wireless or wired communication. Wireless communication can include communication using various protocols or technologies, including WiFi, Bluetooth, infrared, cellular communication, etc. Persons with ordinary skill in the art may understand that the structures shown in FIG. 1 are merely illustrative and do not limit the structures of the electronic device. Terminal 100 can further comprise one or more of a display device, a microphone, a speaker, a user interface, a display (e.g., a touch screen), a network interface, etc.

Memory 120 is used to store software programs and modules of the application software, e.g., program instructions/modules corresponding to method(s) for facial recognition-based authentication. By running software programs and modules stored in the memory 120, the processor 110 executes various function applications and data processing (i.e., implements method(s) for facial recognition-based authentication). In some embodiments, memory 120 comprises high-speed random access memory. In some embodiments, memory 120 comprises non-volatile memory, such as one or more magnetic storage devices, flash memory, or other non-volatile solid-state memory. In some embodiments, memory 120 comprises memory that is remotely disposed relative to the processor 110. Such remote memory can be connected to terminal 100 via a network. Examples of the network comprise, but are not limited to, the Internet, corporate intranets, local area networks, mobile communication networks, and combinations thereof.

Communication module 130 is configured to receive and send data via a network. Specific examples of the network comprise wireless networks provided by communication suppliers for terminal 100. In some embodiments, communication module 130 comprises a network interface controller (NIC), which can connect to other networks via a base station and thereby communicate with the Internet. In some embodiments, communication module 130 comprises, or otherwise corresponds to, a radio frequency (RF) module, which is configured to wirelessly communicate with a network such as the Internet.

Terminal 100 can include hardware components (including circuits), software components (including computer code stored on computer-readable media), or combinations of both hardware components and software components. Terminal 100 as illustrated in FIG. 1 is merely one example of a particular, specific embodiment with the purpose of presenting the types of components that may exist in the mobile device.

In some embodiments, terminal 100 comprises a touch display device (also called a "touchscreen" or a "touch display screen"). In some embodiments, terminal 100 comprises a graphical user interface (GUI). The user may engage in human-machine interaction with the GUI by finger contact and/or gestures touching the touch-sensitive surface. The human-machine interaction function optionally includes one or more of the following interactions: creating a web page, drawing, text processing, producing an electronic document, gaming, videoconferencing, instant messaging, receiving/sending e-mail, calling interface, playing digital video, playing digital audio, and/or Internet browsing, etc. The executable instructions for executing the human-machine interaction functions described above are configured/stored in computer program products executable by one or more processors or in readable storage media.

Figure 2:
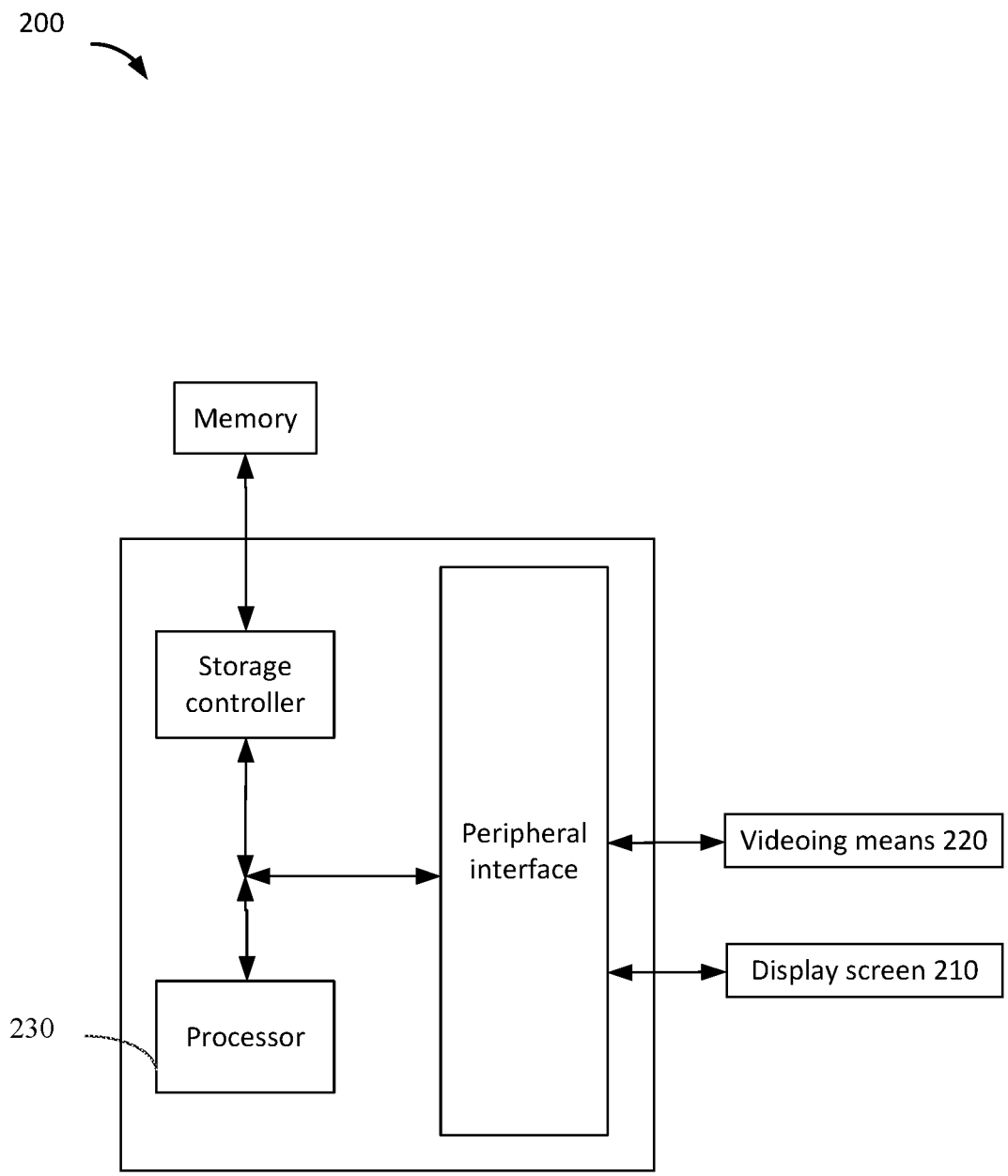
FIG. 2 is a structural block diagram of a terminal for a facial recognition-based authentication according to various embodiments of the present application.

FIG. 2 is a structural block diagram of a terminal for a facial recognition-based authentication according to various embodiments of the present application.

Referring to FIG. 2, terminal 200 for facial recognition-based authentication is provided. Terminal 200 can be implemented in connection with terminal 100 of FIG. 1, system 300 of FIG. 3, smartphone 900 of FIG. 9, and/or computer terminal 1000 of FIG. 10. Terminal 200 can implement, at least in part, process 400 of FIG. 4, process 600 of FIG. 6, process 700 of FIG. 7, and/or process 800 of FIG. 8.

Terminal 200 can include display screen 210, video device 220 (e.g., a video capturing device such as a camera), and a processor 230.

Terminal 200 can correspond to a smartphone, a tablet computer, a notebook computer, or other smart device. In some embodiments, terminal 200 is a device (e.g., a desktop computer) externally connected to a video camera means. For example, in the event that terminal 200 is a smartphone, display screen 210 can correspond to a smartphone display screen, video means 220 (e.g., video camera) can correspond to the camera of a smartphone (e.g., a front camera of the smartphone), and processor 230 can correspond to a smartphone processor. In the event that terminal 200 is a desktop computer, display screen 210 can correspond to a desktop computer display screen, and processor 230 can correspond to a desktop computer processor. Because desktop computers are generally not configured with video cameras, an external video camera may be connected to the computer, in which case video means 220 (e.g., the video camera) can correspond to an external video camera.

Display screen 210 is configured to project (e.g., display) projection information. The projection information can be content displayed by the display screen. The projection information can be updated by updating the display content of the display screen.

In some embodiments, display screen 210 is a terminal device display. For example, display screen 210 can be an input/output device of terminal 200. Display screen 210 can display certain electronic information content onto the screen and is a display tool for reflecting such information. For example, display screen 210 can reflect the electronic information content (which is displayed onto the screen) onto the human eye. The projection information can be content displayed on the display screen. The content (e.g., the projection information) can comprise one or more of pictures, text, tables, etc. The projection information can be updated by updating the content displayed on the display screen. Display screen 210 can project the projection information in real time. For example, the projection information being displayed by display screen 210 can be displayed contemporaneously with terminal 200 processing content to be displayed by display screen 210. The projection information can comprise one or more of color information, shape information, brightness information, and information associated with one or more other characteristics.

According to various embodiments, one or more images captured after the projection information has been displayed (e.g., projected onto a user) can be processed according to one or more image processing (e.g., preprocessing) technologies.

In some embodiments, in the event that an image is of sufficient resolution (e.g., a resolution exceeding a predefined threshold), content from the captured images can be extracted and compared. For example, in the event that project information that corresponds to content is updated, project information corresponding to the content (e.g., one or more of pictures, text, tables, etc.) can be extracted from an image captured before project information is updated and from an image captured after the project information is updated, and compared to determine whether the target object is a virtual object (e.g., whether the difference between the two images matches an updating to the projection information).

According to various embodiments, updating of the display content (e.g., projection information) of the display screen includes, but is not limited to: changing the display brightness of display screen 210, changing the display color of display screen 210, or changing the shape of a certain graphic on display screen 210.

Video means 220 (e.g., video camera) is configured to capture (e.g., shoot) a first image of the current target object after projecting (e.g., displaying) the projection information onto the target object through display screen 210, and, after the projection information is modified (e.g., updated), to capture a second image of the target object with the projection information updated.

Video device 220 can be a video input device (such as a video camera, etc.) having functions such as videoing and still-image capturing. After capturing images through a lens, a light-sensing component circuit and control component internal to video device 220 process and convert the images to digital signals recognizable by a terminal device. Then, after inputting the digital signals to the terminal device via a wireless (e.g., Bluetooth, WiFi, infrared, etc.) connection or a wired (e.g., a parallel port, USB, micro USB, fire wire, etc.) connection, the image is restored by software. The target object can be any object for which image information needs to be acquired through a video camera. After display screen 210 projects (e.g., displays) the display content on the display screen onto the target object, video device 220 can capture (e.g., shoot) and thus acquire the current image (which can serve as the first image) of the target object. After display screen 210 updates the content displayed on its screen, video device 220 captures and thus acquires the image (which can serve as the second image) of the target object onto which the display screen has projected the updated projection information.

According to various embodiments, video device 220 (e.g., the video camera) is configured to capture, or otherwise obtain, a first image of a target object before the display device updates the display content of the screen, and a second image of the target object after the display device has updated the display content of the screen. The second image includes feedback information of the target object after the display device has updated the display content of the screen. The feedback information can include, but is not limited to: whether the brightness of the real-time images has varied with the brightness displayed by the display screen; whether the color of the real-time images has varied with the color displayed by the display screen; whether the reflected image of the target object (e.g., the reflection of the eyeballs of the target object) exhibits, or otherwise includes, the shape currently displayed by the display screen, etc. The feedback information can be comprised in, or derived from, the second image.

Processor 230 is configured to process or analyze the first image and the second image. For example, processor 230 can be configured to compare the first image and the second image. Processor 230 can use the results of comparing the first image and second image in connection with determining whether the target image is a virtual object. For example, processor 230 can use the obtained image difference data as a basis for determining whether the target object is a virtual object.

Processor 230 can be a CPU with an image processing function. In some embodiments, the virtual object is a two-dimensional image or a three-dimensional model of the target object. After the first and second images of the target object are obtained (e.g., acquired) with a video device, processor 230 can compare the information data contained in the first image and the second image. Thus, processor 230 obtains image difference data and uses the image difference data as a basis for determining whether the current target object is a virtual object.

The virtual object can be a photograph of the target object, a three-dimensional model (such as a wax likeness or the like) of the target object, a video, slides of consecutive pictures, or images synthesized from photograph-based software simulations and including actions (e.g., sequential images that collectively depict an action).

In some embodiments, taking a target object that is a human face as an example, there is a significant difference between the feedback of the human face to changes in the display content of a display screen and the feedback of pictures, video, or simulation software to changes in the display content of a display screen. Feedback can correspond to information derived from a reflection from the target object of content displayed from the display screen. Therefore, the feedback data for a target object can be used as a basis for assessing whether the current target is the face of a real person or contains a virtual human face (e.g., including a photograph or a video of a human face).

According to various embodiments, when projection information is projected onto a target object (e.g., via display of the projection information from a display of the terminal), a first image obtained from the current capturing of the target object is acquired. After the projection information is modified, a second image obtained from capturing the target object is acquired when updated projection information is being projected. The first image and the second image are compared, and image difference data is obtained. The first image and the second image can be compared on a pixel-by-pixel basis, or according to one or more other image comparison technologies. The image difference data can include information indicative of the difference in a location, size, shape of the image, color, brightness, and/or a difference of each pixel color, a difference of each pixel brightness, a difference between two colors of the pixels, a difference between the brightness of the pixels, etc. For example, the image difference data can correspond to a difference between the first image and the second image. The image difference can be a measure of an extent to which the second image differs from the first image. In some embodiments, the image difference data indicates whether the second image comprises updated content corresponding to a modification to projection information displayed by the terminal, or the image difference data includes information from which an indication of whether the second image comprises updated content corresponding to a modification to projection information displayed by the terminal is derived. The image difference data serves as a basis for determining whether the target object is a virtual object.

In some embodiments, one or more characteristics of a display screen (e.g., a display brightness, a display color, content for display, etc.) are modified and projected onto a target object. A video device is used to obtain the first image (e.g., of the target object) and the second image (e.g., of the target object) before and after the display screen changes, and the first image and the second image undergo comparative analysis. Image difference data corresponding to a difference between the first image and the second image serves as a basis for determining whether the current target object is a virtual object. Changing the content projected onto the target object will change the content obtained during the process of filming the target object. Accordingly, various embodiments provide a more robust authentication process because content used in malicious attempts to circumvent authentication uses content that does not include a difference between the capture of two images. In various embodiments, the projection information being displayed by the terminal is purposefully updated and images (e.g., the first image and the second image) captured before and after such update are used in connection with determining whether the target being captured is real (e.g., if the target object is indeed real, then the captured images will reflect a difference corresponding to the difference between the projection information before update and the projection information displayed after information displayed by the terminal is updated). Content (such as prerecording video of corresponding actions, showing slides of consecutive pictures, or images of actions such as head-nodding or shaking or eye-blinking synthesized through computer simulations) employed by malicious parties attempting authentication is generally two-dimensional images. Therefore, in the event that the projection information projected onto the two-dimensional image is modified, and a malicious party is using a same virtual object to attempt a malicious authentication, there will be no difference between the change results for any two areas within the two-dimensional images. According to various embodiments, the scheme described above (e.g., updating the projection information, determining image difference data, etc.) to assess whether the target object is also a two-dimensional image (i.e., a virtual object) can be used in connection with determining whether a target object is a virtual object. It is thus possible to determine, after continually testing and modifying projection information, the following: if a difference between the image variation results of different areas in the first image and the second image that were captured exists, then the target object is deemed to not be a virtual object, but rather a living entity object. For example, the process for authentication according to various embodiments can be used in the detection of a living object (e.g., a living person) and identity authentication based on real-time feedback of the target object to (e.g., in response to) display changes and thus achieves the technical effects of improving live human-face detection accuracy and reducing attacks by virtual objects on authentication systems.

Various embodiments solve the technical problem of existing live recognition-based authentication systems that are vulnerable to video or image attacks, in which illegitimate users make use of the simulated actions of legitimate users by employing live actions to implement recognition.

In some embodiments, in the event that a terminal device activates an authentication function (e.g., in response to activating the authentication function), the terminal device can activate (e.g., use) processor 230 to determine whether the target object is a virtual object.

In some embodiments, a first image comprises at least: a first facial image and a first background image of the target object when projecting the first projection information; and a second image comprises at least: a second facial image and a second background image of the target object when the second projection information is displayed (e.g., projected). The projection information at least comprises one of the following: projection brightness, projection color, and projection graphics. In some embodiments, the projection information comprises a change to one or more of projection brightness, projection color, and projection graphics.

In some embodiments, projection information comprises at least one of the following: projection brightness, projection color, and projection graphics. The first projection information can correspond to projection information before the projection information is modified (e.g., before the terminal displays the information corresponding to the second image). The second projection information can correspond to projection information after modification (e.g., the information corresponding to the second image so as to create a difference between the second image and first image with which to determine whether the target image is a virtual image). The first image can correspond to an image of the target object obtained before the projection information is modified (e.g., an image of the target object based on the first projection information). The first image can include a first facial image and a first background image of the target object. The first image can correspond to an image captured when the first projection information is being projected. The second image can correspond to an image of the target object obtained after the projection information is modified (e.g., an image of the target object generated based on the second projection information). The second information can include a second facial image and a second background image of the target object. The second image can correspond to an image captured when the second projection information is being projected.

According to various embodiments, it is possible to determine whether a target object is a living object or a virtual object.

In some embodiments, processor 230 is configured to determine that the target object is a virtual object. The target object is determined to be a virtual object in the event that the image difference data is null. The image difference data being null represents the fact that the image data of the first image and of the second image are the same. For example, if the image difference data corresponding to a difference between the first image and the second image is below a predefined threshold, the target object can also be deemed to be a virtual object. As another example, if the image data corresponds to no difference between the first image and the second image, then the target object can be deemed to be a virtual object.

In some embodiments, in the event that image difference data serves as a basis for determining whether a target object is a virtual object, if the image difference data is null (e.g., the first image and the second image have the same image data, and there is no image difference data), the determination can be made that the target object is a virtual object. If the difference data is not null (e.g., the first image and the second image do not have identical data, and there exists image difference data, or there exists image data that exceeds a preset threshold of difference between the first image and the second image), the determination can be made that the target object is a living object (or that the object is not a virtual object).

In some embodiments, image difference data includes: a first degree of variation from comparing the first facial image to the second facial image and a second degree of variation from comparing the first background image to the second background image.

In some embodiments, processor 230 is configured to determine that the target object is a virtual object if the first degree of variation is the brightness variation value and/or the color variation value of the entire face (e.g., when the projection information is (or includes) projection brightness and/or projection color), and the difference between the first degree of variation and the second degree of variation falls within a first predetermined range of variation. The brightness variation or the color variation can be computed in various manners. For example, the brightness variation or the color variation can be computed based on an average brightness (or color) difference between pixels in a region, an average RGB color difference of the pixels in the region, etc. If the projection information projected onto the target object is modified, the first degree of variation is determined by recording the facial image obtained by capturing the target object and computing the variance of the target object, and the second degree of variation is determined by capturing the background image in which the target object is located and computing the variance of the background image. The capturing of the target can comprise identifying an area in the target object. For example, capturing the target object can include using face detection technology to detect a designated bit area (e.g., corresponding to the face) of an image. The target object can correspond to a face; by comparing two images before and after an updating of the projection information, a difference between the area corresponding to the face in a first image and the area corresponding to the face in a second image can be computed. The difference between the face in a first image and the area corresponding to the face in a second image can correspond to a difference in brightness, color, content, or one or more other characteristics. The variance of the target object can correspond to a difference in brightness, color, content, or one or more other characteristics of the target object. The background image can correspond to an area of an image that is captured that is outside the target object. For example, in the event that the target object is a face, the background area can correspond to the area of an image that is outside the area of the face (e.g., that is detected). A facial recognition or detection technology can be used to identify a face in an image, and the other or remaining portions of the image can be deemed the background image or background area. The brightness variation value can be a difference between the first background image and the second background image. The differences the first background image and the second background image can correspond to a difference in brightness, color, content, or one or more other characteristics.

In some embodiments, the projection information is (or includes) projection brightness and/or projection color, the projection brightness is the brightness displayed by a display screen; the projection color is the color displayed by a display screen; the first facial image can be the facial image recorded from capturing the target object before the brightness or color of the display screen changed; the second facial image can be the facial image recorded from capturing the target object after the brightness or color of the display screen changed; the first background image can be the background image obtained from capturing the background in which the target object was located before the brightness or color of the display screen changed; the second background image can be the background image obtained from capturing the background in which the target object is located after the brightness or color of the display screen changed; a first degree of variation can be obtained by comparing the first facial image with the second facial image and computing a difference between the first facial image and the second facial image; and a second degree of variation can be obtained by comparing the first background image with the second background image and computing a difference between the first background image and the second background image. The first degree of variation and the second degree of variation can serve as a basis for determining whether the target object is a virtual object. For example, if the first degree of variation is the brightness variation value and/or color variation value of the entire face (e.g., the face in the first facial image and/or the second facial image), and the difference between the first degree of variation and the second degree of variation falls within a first predetermined range of variation, then the target object is determined to be a virtual object. The difference between the first facial image and the second facial image can correspond to a difference in a brightness, color, content, or one or more other characteristics. For example, a difference in brightness can be computed based on: Average Brightness=All Pixel Brightness and/Number of Pixels. For example, the average brightness of the first facial image can be computed, the average brightness of the second facial image can be computed, and a difference between the average brightness of the first facial image and the average brightness of the second facial image can be computed.

Various embodiments use partial brightness variation of images as a basis for determining whether a target object is a virtual object. Because the brightness of a display screen varies, the degrees of brightness variation of the face portion and the background portion in picture brightness acquired by a video camera in real time have certain differences. The brightness variation of the face portion of a real person can become more noticeable because the distance of the face portion from the display screen will not be the same as before (e.g., a change in the color or brightness of the first image and the second image can be detected), but the brightness variation of the background portion may not be as noticeable because the distance of the background portion will remain approximately the same. As for pictures, video, software simulation, and other such methods, the distances from the display screen of the face portion and the background portion are generally dissimilar, but the degree of brightness variation will be the same. According to various embodiments, a difference in brightness can be computed based on Average Brightness=All Pixel Brightness and/Number of Pixels. An average brightness of the face area in the first image is computed, and average brightness of the face area in the second image is computed, and a difference is computed between the average brightness of the face area in the first image and the average brightness of the face area of the second image. A difference in color can be computed in a similar manner. Determination of the difference in brightness and difference in color is not limited to the above. For example, various other processes for determining the differences (e.g., in brightness or in color) can be used.

According to various embodiments, image difference data includes: a first degree of variation from comparing the first facial image to the second facial image, and a second degree of variation from comparing the first background image to the second background image. In the event the first facial image and the second facial image include characteristic information on at least one biological characteristic of the target object face, and in the event the projection information corresponds to projection brightness and/or projection color, the processor 230 is configured to determine that the target object is a virtual object if the first degree of variation is the brightness variation value and/or the color variation value of any one or more biological characteristics of the face, and if the difference between the first degree of variation and the second degree of variation falls within a second predetermined range of variation. If the projection information projected onto the target object is modified, the first degree of variation is determined by recording the facial image obtained by capturing the target object and computing a difference between the facial area in the first image and the facial area in the second image, and the second degree of variation is determined by capturing the background image in which the target object is located and computing a difference between a background area in the first image and a background area in the second image.

The biological characteristics can be inherent physiological characteristics of the target object face, which could include eye characteristics, mouth characteristics, eyebrow characteristics, ear characteristics, nose characteristics, skin characteristics, etc. The eye characteristics can include: pupil characteristics (e.g., size and/or location of the pupil), iris characteristics (e.g., shape and/or location of the iris), and eyeball characteristics (e.g., size of and/or image reflected by the eyeball), etc. When the projection information is projection brightness and/or projection color, the first facial image can be the facial image recorded from capturing the target object before the brightness or color of the display screen changed. The first facial image can include characteristic information on at least one biological characteristic of the target image face. The second facial image can be the facial image recorded from capturing the target object after the brightness or color of the display screen changed. The second facial image includes characteristic information on at least one biological characteristic of the target image face. The first background image can be the background image obtained from capturing the background in which the target object was located before the brightness or color of the display screen changed. The second background image can be the background image obtained from capturing the background in which the target object is located after the brightness or color of the display screen changed; a first degree of variation is obtained by comparing the first facial image with the second facial image; a second degree of variation is obtained by comparing the first background image with the second background image. The first degree of variation and the second degree of variation serve as the basis for determining whether the target object is a virtual object. If the first degree of variation is the brightness variation value and/or color variation value of any one or more biological characteristics of the face, and the difference between the first degree of variation and the second degree of variation falls within a second predetermined range of variation, then the determination is made that the target object is a virtual object.

In some embodiments, the biological characteristics can be skin characteristics. As an example of a target object that is a face or a photograph thereof, if the target object is the facial skin of a person, then the person's facial skin in the second image acquired by a phone's front camera will vary in brightness as the brightness of the display screen varies. If the target object is a photograph of a person's face, then the person's facial skin in the second image (photograph of the person's face) acquired by the phone's front camera will not co-vary in brightness in the same way as facial skin in the first image because the photograph reflects light differently. For example, as between facial skin and a photograph, light reflection properties is not the same for the different materials; and a face has a 3D shape, and the photograph is 2D (e.g., the photograph is flat), resulting in different characteristics in the reflection of light.

According to various embodiments, it is determined whether a target object is a virtual object based on the degree of brightness variation of the various parts of a face. As the brightness and/or color of the display screen varies, a difference is exhibited in the degree of brightness and/or color between the face portion and the background portion in the brightness of a picture acquired in real time by a video camera. In the case of a real person, the brightness variation between high-intensity light portions and low-intensity light portions of the face will be dissimilar because of the face's 3D structure. In the case of a picture, video, software simulation, or other such method, the brightness variation pattern of the various portions of the face will differ from that of a real person because of its flat structure.

According to various embodiments, the image difference data includes: a difference corresponding to an image variation value for at least one biological characteristic in a first facial image and a second facial image. A difference corresponding to the projection information is projection brightness and/or projection color. Processor 230 can obtain the brightness variation values and/or color variation values of any two biological characteristics in the event the projection information is projection brightness and/or projection color. If the image variation values of any two or more biological characteristics fall within a third predetermined variation range, then the determination is made that the target object is a virtual object. If the projection information projected (e.g., displayed) onto the target object is modified, the image difference data is determined by recording the characteristic image obtained from capturing at least one biological characteristic of the target object face.

In some embodiments, the first facial image can be the facial image obtained by recording and capturing the target object before the display screen modifies the brightness or color. The first facial image can include characteristic information on at least one biological characteristic (e.g., eyes, mouth, etc.) of the target object face. The second facial image can be the facial image obtained by recording and capturing the target object after the display screen modifies the brightness or color. The second facial image can include characteristic information on at least one biological characteristic (e.g., eyes, mouth, etc.) of the target object face. When the projection information is projection brightness and/or projection color, the brightness variation value and/or the color variation value of any two biological characteristics are acquired by the video device. If the image variation values of any two or more biological characteristics fall within a third predetermined variation range, then the determination is made that the target object is a virtual object.

Various embodiments determine whether the target object is a virtual object based on the degree of brightness and/or color variation of at least one biological characteristic (e.g., eyes, mouth, etc.) of a human face. As the brightness and/or color of the display screen varies, the brightness and/or color of the eyes and mouth acquired in real time by the video camera will vary accordingly (if the target object being captured is indeed a real object such as a person).

In some embodiments, the projection information comprises: projection graphics. When the biological characteristic is an eyeball, the image difference data is the image variation value of the biological characteristic in the first facial image and the second facial image, which is the variation value of the image content reflected by the eyeball. Processor 230 can be configured to determine that the target object is a virtual object if the variation value of the image content is within a fourth predetermined variation range.

In some embodiments, the determination is made as to whether a target object is a virtual object on the basis of a graphic shape projected onto an eyeball. The first facial image can be a facial image obtained by recording and capturing the target object while the display screen displays a first graphic, wherein the first facial image includes image content information on the first graphic reflected from the an eyeball of the target object. While the display screen displays a second graphic, the second facial image can be a facial image obtained by recording and capturing the target object, wherein the second facial image includes image content information on the first graphic reflected from the eyeball of the target object. The projection information can include projection graphics. When the biological characteristic is an eyeball, variation in the image content reflected from the eyeball in the first facial image and second facial image is acquired by the video device. If the image content is the same (e.g., as between the first facial image and the second facial image), then the determination is made that the target object is a real person. If the target objects are dissimilar, then the determination is made that the target object is a virtual object.

Sometimes a wax likeness or other three-dimensional model has human characteristics such as skin and a face with a 3D structure. Therefore, such a model may be used in connection with a malicious authentication attempt. A real person's eyeball is spherical and generally reflects the image in front of the real person's face. However, a picture, video, or software simulation or other such method will not reflect the image in front of the person's face. As the brightness, colors, and shapes of a display screen vary, the images reflected by a real person's eyeball will also vary. A determination as to whether the target object is a real person can be made by detecting the image of the eyeball portion of the facial image.

Various embodiments can be used in connection with preventing a malicious attempt to use a three-dimensional model (such as a wax likeness) of a legitimate user to attempt an authentication with an authentication system. Accordingly, security of an authentication system based on living-thing recognition is enhanced.

According to various embodiments, methods for facial recognition-based authentication can are implemented in a computer device, a mobile device, or similar operating means.

Figure 3:
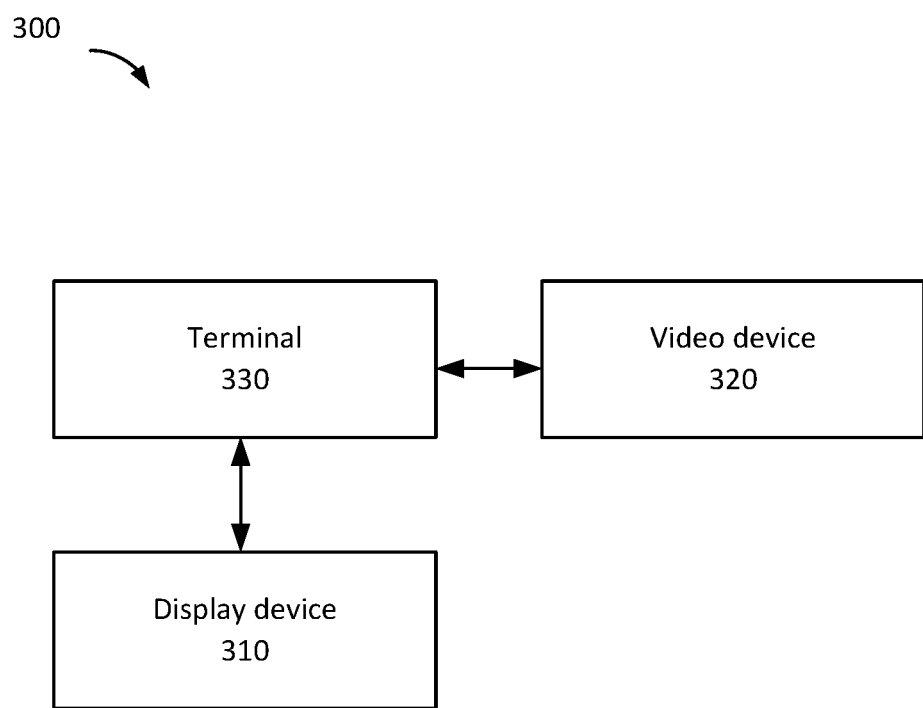
FIG. 3 is a diagram of a system for facial recognition-based authentication according to various embodiments of the present application.

In the run environments described above, the present application provides a facial recognition-based authentication system embodiment. As shown in FIG. 3, the system comprises: a display device 310, a videoing device 320, and a computer terminal 330.

FIG. 3 is a diagram of a system for facial recognition-based authentication according to various embodiments of the present application.

Referring to FIG. 3, system 300 for facial recognition-based authentication is provided. System 300 can be implemented in connection with terminal 100 of FIG. 1, terminal 200 of FIG. 2, smartphone 900 of FIG. 9, and/or computer terminal 1000 of FIG. 10. System 300 can implement, at least in part, process 400 of FIG. 4, process 600 of FIG. 6, process 700 of FIG. 7, and/or process 800 of FIG. 8.

System 300 comprises display device 310, video device 320, and terminal 330.

Display device 310 is configured to project (e.g., display) projection information. The projection information can correspond to, or comprise, content that is displayed by display device 310. As an example, the projection information can comprise an image, a video, text, etc. In some embodiments, the projection information is updated by updating the display content of the display screen.

In some embodiments, display device 310 can be the display screen of a smart terminal device. For example, display screen of the smart terminal device can be an input/output device of the terminal device and can be capable of displaying certain electronic information content onto the screen. The display screen can be a display tool for reflecting such certain electronic information (e.g., a video, an image, text, etc.) onto the human eye. The projection information can be content displayed on display device 310. This content can be pictures, text, tables, etc. The projection information can be updated by updating the content displayed on display device 310. Display device 310 (e.g., the display screen) can be used to project the projection information in real time.

In some embodiments, the updating of the display content (e.g., projection information) of display device 310 includes, but is not limited to, the following methods: changing the display brightness of display device 310, changing the display color of display device 310, changing the shape of a certain graphic on display device 310, or changing the content on display device 310 (e.g., displaying a different content type, a different object, etc.).

Video device 320 is configured to capture one or more images. For example, video device 320 can capture the first image and the second image. Video device 320 communicates with display device 310. Video device 320 can be configured to capture a first image of the current target object after the projection information is projected onto the target object via display device 310. Video device 320 can be configured to capture a second image of the target object. Video device 320 can capture the second image of the target object after the projection information is updated. Accordingly, the second image of the target image can include the projection information updated.

Video device 320 can be a video input device (such as a video camera) having functions such as videoing and still-image capturing. After capturing images through a lens, a light-sensing component circuit and control component internal to video device 320 process and convert the images to digital signals recognizable by a terminal device. After inputting the digital signals to the terminal device via a wireless (e.g., Bluetooth, WiFi, infrared, etc.) connection or a wired (e.g., a parallel port, USB, micro USB, fire wire, etc.) connection, the image is stored by software. The target object can be any object for which image information needs to be acquired through a video camera. After display device 310 projects (e.g., displays) the display content on the display screen onto the target object, the video device may shoot and thus acquire the current image (which serves as the first image) of the target object. After display device 310 updates the content displayed on its screen, the video device 320 captures and thus acquires the image (which can serve as the second image) of the target object onto which the display screen has projected the updated projection information.

In some embodiments, the image of a target object is obtained (e.g., acquired) using an infrared video camera. An infrared video camera can determine (e.g., assess) the temperatures of various parts of the human face (and surroundings or environment thereof) and thus can also assess differences between a real person's face and a picture, video, or software simulation.

Terminal 330 is configured to compare the first image and the second image. Terminal 330 can use the obtained image difference data (e.g., a result from the comparison of the first image and the second image) as a basis for determining whether the target object is a virtual object.

Terminal 330 can be a personal computer. The personal computer can comprise one or more processors. The virtual object can be a two-dimensional image or a three-dimensional model of the target object. After the first image and the second image of the target object are obtained with a video device (or another imaging device), terminal 330 (e.g., a processor thereof) can compare the information data respectively included in the first image and the second image. Thus, terminal 330 can obtain an image difference data (e.g., a result from the comparison of the first image and the second image). Terminal 330 can use the image difference data as a basis for determining that the current target object is a virtual object.

The virtual object can be a photograph of the target object or a three-dimensional model (such as a wax likeness), a video, slides of consecutive pictures, or images synthesized from photograph-based software simulations and containing actions.

According to various embodiments, when projection information is projected onto a target object, a first image obtained from the current capturing of the target object is acquired. After the projection information is modified, a second image obtained from capturing the target object is acquired when updated projection information is being projected. The first image and the second image are compared, and image difference data is acquired. The image difference data serves as a basis for determining whether the target object is a virtual object.

In some embodiments, the screen display of a display device is modified and projected onto a target object. A video device is used to acquire a first image of the target object and a second image of the target object before and after display device changes (e.g., before and after projection information is updated and displayed), and a comparative analysis is performed with respect to the first image and second image. Difference data of the first image and the second image (e.g., data based on the comparative analysis is performed with respect to the first image and second image) serves as a basis for determining whether the current target object is a virtual object. An objective of living-thing detection and identity authentication based on real-time feedback of the target object to display changes can be achieved, live human-face detection accuracy can be improved, and malicious attempts to authenticate using virtual objects for authentication to an authentication system can be reduced.

Various embodiments improve the robustness of live recognition-based authentication systems that are vulnerable to malicious use of videos or images in connection with authentication attempts, in which illegitimate users make use of the simulated actions of legitimate users by employing live actions to implement recognition.

In some embodiments, a first image comprises at least a first facial image and a first background image of the target object when projecting the first projection information; and a second image comprises at least a second facial image and a second background image of the target object when projecting the second projection information. The projection information comprises one or more of projection brightness, projection color, and projection graphics. Various other characteristics of an image displayed can be modified in connection with generating projection information.

In some embodiments, projection information comprises one or more of projection brightness, projection color, and projection graphics. The first projection information can correspond to projection information before modification (e.g., before the projection information is modified). The second projection information can correspond to projection information after modification (e.g., the projection information displayed after the displayed projection information has been updated). The first image can be an image of the target object acquired before the projection information is modified, and can include a first facial image and a first background image of the target object when the first projection information is being projected. The second image can be an image of the target object acquired after the projection information is modified, and can include a second facial image and a second background image of the target object when the second projection information is being projected. Accordingly, it is possible to determine whether a target object is a living object or a virtual object.

Terminal 330 can be further configured to determine that the target object is a virtual object in the event that the image difference data is null. The image difference data being null can correspond to the second image matching the first image. For example, image difference data being null can correspond to the fact that the image data of the first image and image data of the second image are the same.

According to various embodiments, in the event that image difference data serves as a basis for determining whether a target object is a virtual object, if the image difference data is null (e.g., the first image and the second image have the same respective image data, and there is no image difference data), the determination can be made that the target object is a virtual object. Conversely, if the image difference data is not null (e.g., the first image and the second image do not have entirely identical respective image data (or the corresponding image data for the first image and the second image are not within a threshold degree of similarity), and there exists image difference data), the determination can be made that the target object is a living object.

In some embodiments, image difference data includes: a first degree of variation based on comparing the first facial image to the second facial image, and a second degree of variation based on comparing the first background image to the second background image.

Terminal 330 can be configured to determine that the target object is a virtual object if the first degree of variation is the brightness variation value and/or the color variation value of the entire face, and the difference between the first degree of variation and the second degree of variation falls within a first predetermined range of variation, in the event that the projection information comprises projection brightness and/or projection color. If the projection information projected onto the target object is modified, the first degree of variation is determined by recording (e.g., capturing and/or storing) the facial image obtained by capturing the target object, and the second degree of variation is determined by capturing the background image in which the target object is located.

In some embodiments, image difference data includes: a first degree of variation based on comparing the first facial image to the second facial image, and a second degree of variation based on comparing the first background image to the second background image. In the event that the first facial image and the second facial image include characteristic information on at least one biological characteristic of the target object face, and when the projection information comprises projection brightness and/or projection color, the target object is determined to be a virtual object (e.g., by terminal 330) if the first degree of variation is the brightness variation value and/or the color variation value of any one or more biological characteristics of the face, and the difference between the first degree of variation and the second degree of variation falls within a second predetermined range of variation. If the projection information projected onto the target object is modified, the first degree of variation is determined by recording the facial image obtained by capturing the target object, and the second degree of variation is determined by capturing the background image in which the target object is located.

According to various embodiments, the image difference data includes: an image variation value for at least one biological characteristic with respect to a first facial image in relation to a second facial image. In the event that the projection information comprises projection brightness and/or projection color, the brightness variation values and/or color variation values of any two biological characteristics can be obtained (e.g., by terminal 330). If the image variation values of any two or more biological characteristics fall within a predetermined variation range (e.g., a third predetermined variation range), then the target object is determined to be a virtual object. If the projection information projected onto the target object is modified, the image difference data can be determined by recording (e.g., capturing and/or storing) the characteristic image obtained from capturing at least one biological characteristic of the target object face.

In some embodiments, the projection information comprises projection graphics. In the event that the biological characteristic is an eyeball, the image difference data can correspond to the image variation value of the biological characteristic in the first facial image and the second facial image (e.g., the image variation value of a characteristic in the first facial image in relation to the characteristic in the second facial image). For example, the image variation value can comprise the variation value of the image content reflected by the eyeball (e.g., a variation of the image content reflected by the eyeball in the first image relative to the image content reflected by the eyeball in the second image). Terminal 330 can be configured to determine that the target object is a virtual object in the event that the variation value of the image content lies within a predetermined variation range (e.g., fourth predetermined variation range). A variation range can correspond to a range in a degree of similarity between two images.

Various embodiments comprise a method for authentication based on facial recognition. Please note that steps depicted in the flowcharts in the drawings can be implemented by a computer system, such as a group of computers capable of executing commands. Moreover, although logical sequences are depicted in the flowcharts, the steps that are depicted or described may, in some situations, be executed in sequences other than those here.

Methods for authentication based on facial recognition or based on determining differences between detected facial images can be implemented by a terminal such as terminal 100 of FIG. 1. As shown in FIG. 1, terminal 100 can comprise one or more processors 110. The processors 110 can include, but are not limited to, processing means such as microprocessors (MCU) or programmable logic devices (FPGA). Terminal 100 can comprise memory 120. Memory 120 can be configured to store data. Terminal 100 can comprise communication module 130. Communication module 130 can be configured for communication functions. In addition, terminal 100 can further comprise: a display device, input/output interfaces (I/O interfaces), a universal serial bus (USB) port (e.g., the USB port can be included as one port among ports serving as I/O interfaces), a network interface, a power supply, and/or a camera. Persons with ordinary skill in the art may understand that the structures shown in FIG. 1 are merely illustrative and do not limit the structures of the electronic device. For example, the mobile device 100 may further comprise more or fewer components than shown in FIG. 1 or may have a configuration that differs from the one shown in FIG. 1.

The one or more processors 110 and/or other data processing circuits can generally be referred to as "data processing circuits" herein. The data processing circuits can fully or partially be embodied as software, hardware, firmware, or any combination thereof. In addition, a data processing circuit can be a single, independent processing module or any of the other components that are fully or partially integrated with terminal 100 (e.g., a mobile device). For example, the data processing circuit controls can be implemented as a processor (e.g., selects the interface-connected variable resistance terminal path).

A display device can, for example, be a touch-screen liquid crystal display (LCD). The liquid crystal display can enable the user to interact with the user interface of the terminal 100 (e.g., a mobile device).

Terminal 100 of FIG. 1 can include hardware components (including circuits), software components (including computer code stored on computer-readable media), or combinations of both hardware components and software components. Please note that FIG. 1 is merely one example of a particular, specific embodiment with the purpose of presenting the types of components that may exist in the mobile device.

Figure 4:
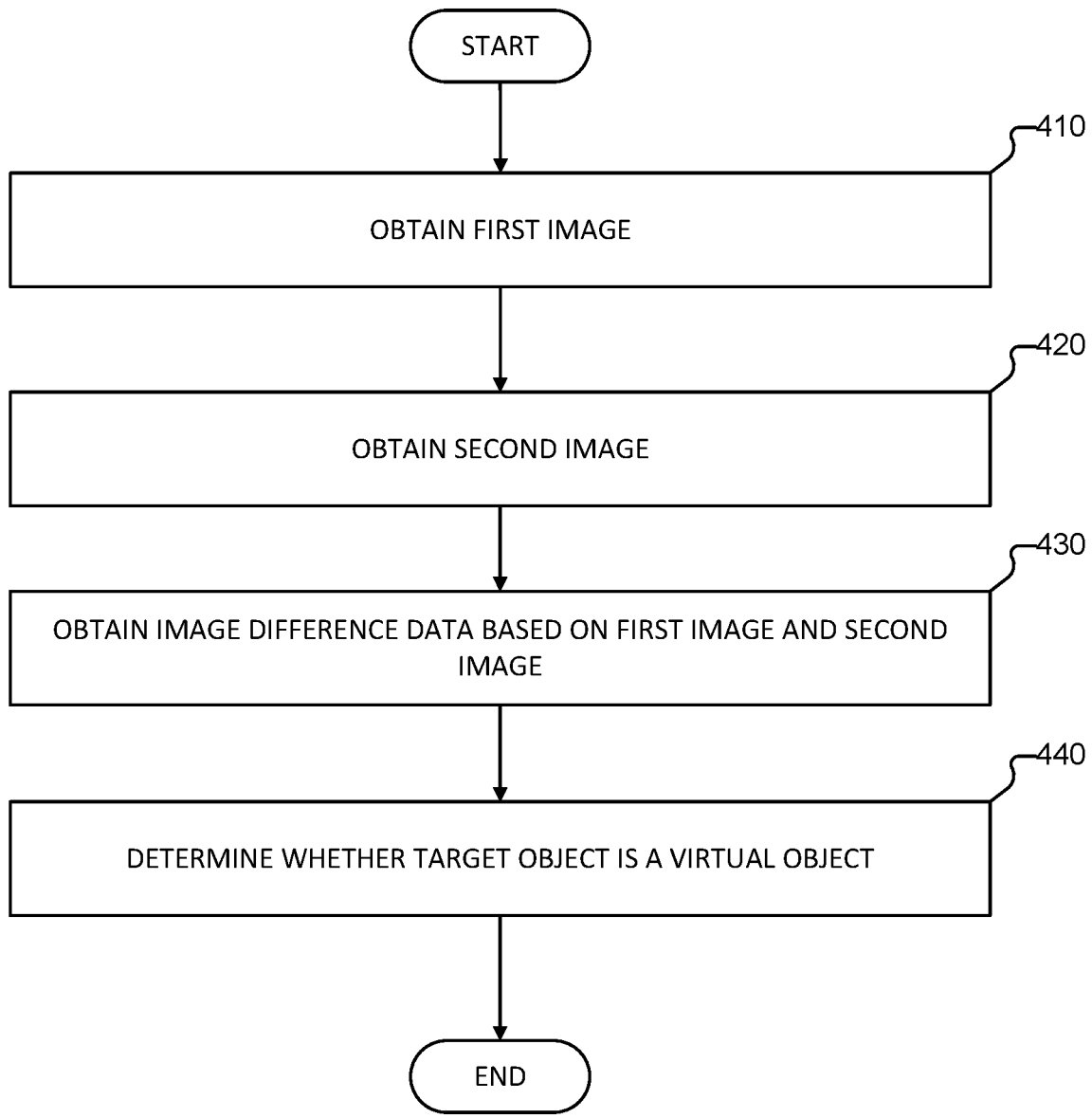
FIG. 4 is a flowchart of a facial recognition-based authentication method according to various embodiments of the present application.

FIG. 4 is a flowchart of a facial recognition-based authentication method according to various embodiments of the present application.

Referring to FIG. 4, process 400 for facial recognition-based authentication is provided. Process 400 can be at least partially implemented by terminal 100 of FIG. 1, terminal 200 of FIG. 2, system 300 of FIG. 3, smartphone 900 of FIG. 9, and/or computer terminal 1000 of FIG. 10. Process 400 can be implemented in connection with process 600 of FIG. 6, process 700 of FIG. 7, and/or process 800 of FIG. 8.

At 410, a first image is obtained. The first image can be an image of a target object. For example, the first image of the target object can be obtained by an image capturing device such as a video camera, a camera, etc. The first image can be obtained in connection with projection information being projected (e.g., displayed) on the target object. For example, when projection information has been projected upon a target object, the first image obtained in the current capturing of the target object can be acquired.

The projection information can be content (such as pictures, text, etc.) displayed on an electronic display screen or parameter information (such as the brightness, color, etc. displayed by the display screen) displayed on an electronic display screen. In some embodiments, the projection information can be information projected on the target object by another device and causing the target object to present different variations. The target object can be any object for which image information is to be acquired through a video device. For example, the target object can be a living object or a photograph, video image, etc. of a living object. In some embodiments, after projection information is projected onto the target object, it is possible to acquire in the current moment a first image obtained by capturing the target object.

In some embodiments, an image of the target object can be captured using a video input device (such as a video camera) having functions such as videoing and still-image capturing. After images are acquired through a lens, a light-sensing component circuit and control component internal to the video device process and convert the images to digital signals recognizable by a terminal device. Then, after inputting the digital signals to the terminal device via a wireless (e.g., Bluetooth, WiFi, infrared, etc.) connection or a wired (e.g., a parallel port, USB, micro USB, fire wire, etc.) connection, the image is processed (e.g., restored) by software.

In some embodiments, when the target object is the face of a person or a photograph thereof, projection information can be projected onto the target object through the display screen of a smartphone and an image (e.g., the first image) of the target object can be obtained by capturing the target object with an image capturing device (e.g., a front camera of a terminal).

Figure 5A:
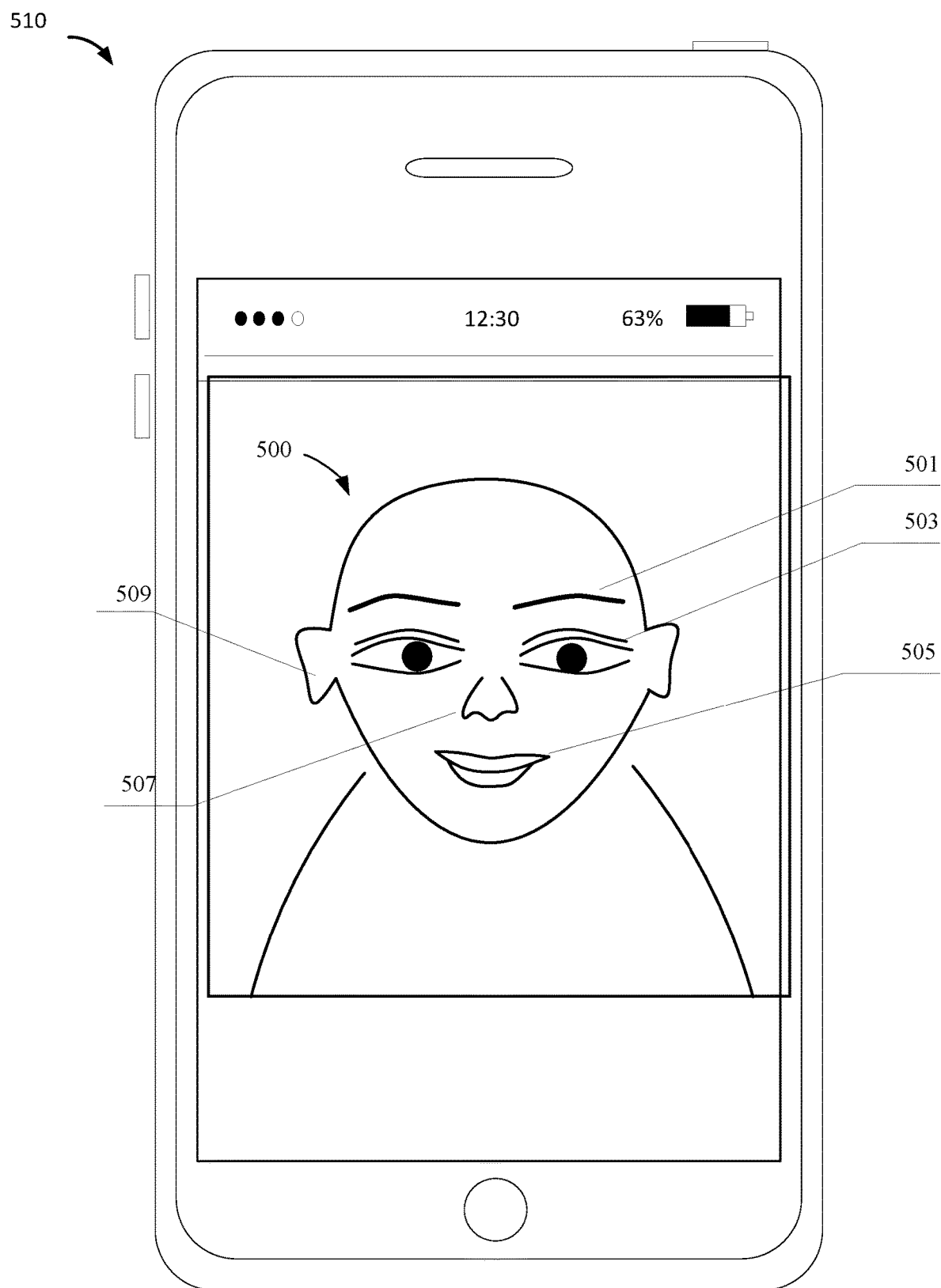
FIG. 5A is a diagram of a human face object obtained by a front video camera of a terminal according to various embodiments of the present application.

FIG. 5A is a diagram of a human face object obtained by a front video camera of a terminal according to various embodiments of the present application.

Referring to FIG. 5A, object 500 captured in connection with an authentication is provided. Capturing and/or processing object 500 can be performed by, or in connection with, terminal 100 of FIG. 1, terminal 200 of FIG. 2, system 300 of FIG. 3, smartphone 900 of FIG. 9, and/or computer terminal 1000 of FIG. 10. Object 500 can be captured, processed, or used in connection with an authentication as part of process 400 of FIG. 4, process 600 of FIG. 6, process 700 of FIG. 7, and/or process 800 of FIG. 8.

Object 500 can be a face obtained (e.g., captured and/or stored) by a front camera of a terminal 510 such as a mobile phone. As shown in FIG. 5A, object 500 (e.g., the face) includes: eyebrows 501, eyes 503, mouth 505, nose 507, and ears 509. These features can be identified by an image identification program or other appropriate programs. For example, the features can be identified based on Facial Landmark Detection, or feature point detection. Feature point detection can be processed using machine learning. For example, feature point detection can be processed using an open source library Dlib, or the like.

Returning to process 400 of FIG. 4, at 420, a second image is obtained. The second image can be an image of a target object. For example, the second image of the target object can be obtained by an image capturing device such as a video camera, a camera, etc. The second image can be obtained in connection with projection information being projected on the target object (e.g., displayed by a display device and projected onto the target object). For example, the second object can be obtained after projection information (e.g., projected on the target object) is modified (e.g., the projection information can be modified in relation to projection information being projected on the target object when the first image is captured). For example, after the projection information is modified, the second image obtained from capturing the target object when projecting the updated projection information can be acquired. The projection information can be modified by changing the color of an image displayed on a display of the terminal, changing the brightness of a display of the terminal, changing a size of an image displayed on a display of the terminal, changing the image displayed on a display of the terminal, etc.

After the projection information is modified (e.g., the color of the image displayed on a mobile device or the brightness of a display screen can be modified while the mobile device is capturing the target object), the projection information is projected onto a target object, and the second image is obtained by capturing the target object.

As an example, in the event that the target object is a face of a person or a photograph thereof, projection information is projected onto the target object through the display screen of a smartphone and an image of the target object is obtained by capturing the target object with a front camera. The modifying of projection information can comprise intensifying the brightness of the display screen. When updated projection information is projected onto the person's face (e.g., the information displayed by the brightness-intensified smartphone screen), an image (e.g., the second image) of the target object is captured by the phone's front camera.

Figure 5B:
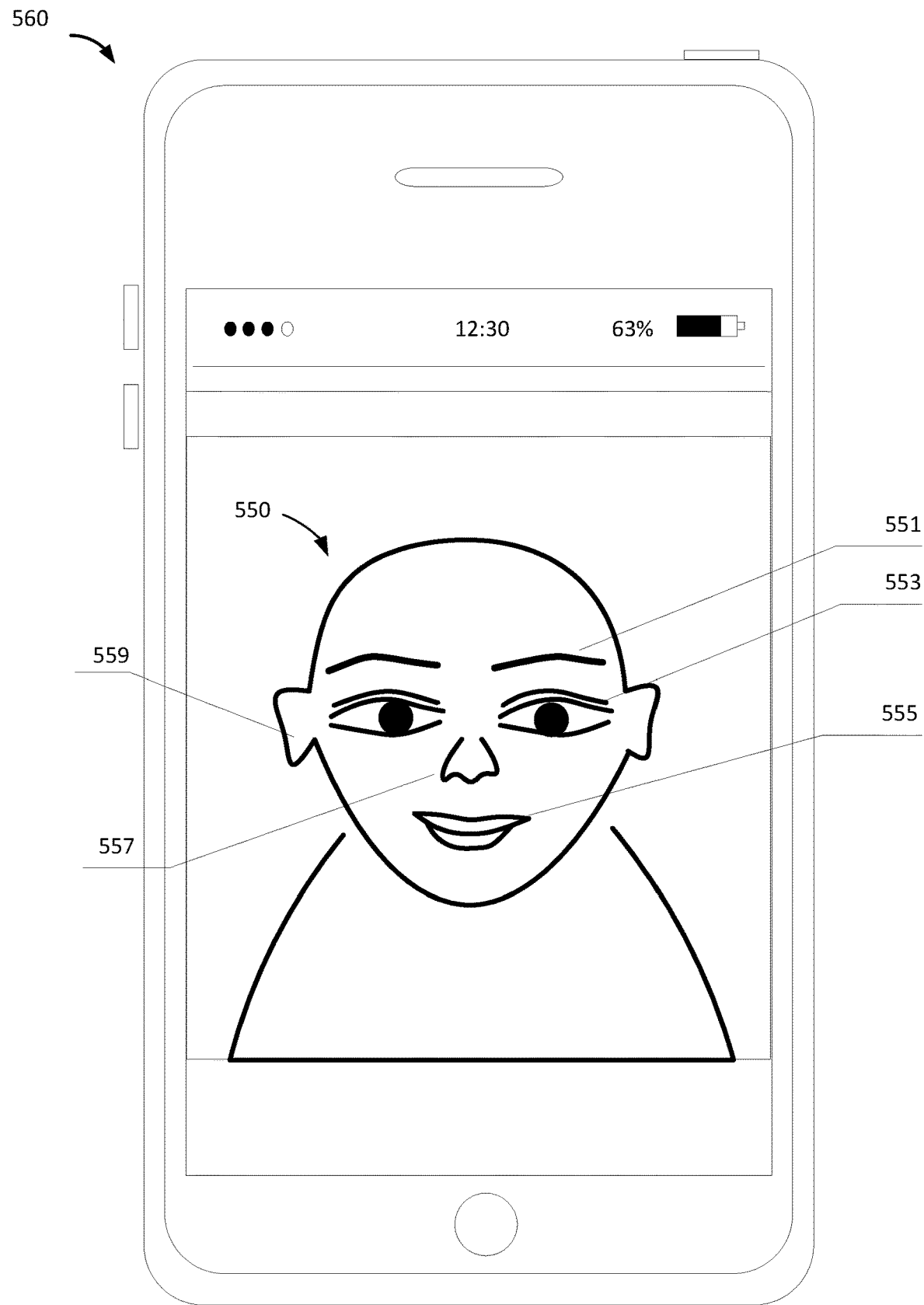
FIG. 5B is a diagram of a human face object obtained by a front video camera of a terminal after brightness associated with the terminal is increased according to various embodiments of the present application.

FIG. 5B is a diagram of a human face object obtained by a front video camera of a terminal after brightness associated with the terminal is increased according to various embodiments of the present application.

Referring to FIG. 5B, object 550 captured in connection with an authentication is provided. Capturing and/or processing object 550 can be performed by, or in connection with, terminal 100 of FIG. 1, terminal 200 of FIG. 2, system 300 of FIG. 3, smartphone 900 of FIG. 9, and/or computer terminal 1000 of FIG. 10. Object 550 can be captured, processed, or used in connection with an authentication as part of process 400 of FIG. 4, process 600 of FIG. 6, process 700 of FIG. 7, and/or process 800 of FIG. 8.

Object 550 can be a face obtained (e.g., captured and/or stored) by a front camera of a terminal 560 such as a mobile phone. As shown in FIG. 5B, object 550 (e.g., the face) includes: eyebrows 551, eyes 553, mouth 555, nose 557, and ears 559.

Returning to process 400 of FIG. 4, at 430, image difference data is obtained. The image difference data can be obtained based at least in part on the first image and the second image. For example, the image difference data can be based at least in part on a comparison of the first image and the second image. The image difference data can indicate an extent of a difference or a similarity between the first image and the second image. In some embodiments, image data associated with different areas of the first image and the second image (e.g., image variation results in different areas) are obtained (e.g., extracted from the respective first image and the second image), such image data obtained from the first image and the second image are compared, and image difference data is obtained. The image difference data corresponds to a result of a comparison between the image data (e.g., image variation results) associated with the different areas of the first image and the second image. The image data associated with different areas of the first image and the second image can correspond to areas in the first image and second image that comprise a particular feature of an object (e.g., an eye, a part of the face, a part that reflects information projected onto the object, etc.). The image difference data can be obtained based on identifying a part of the first image corresponding to an area of the target object or a feature of the target object (e.g., an eye on a face of the target object), identifying a corresponding part of the second image corresponding to an area of the target object or a feature of the target object, generating a difference graph based on the part of the first image and the part of the second image, and determine a difference area based on the part of the first image and the part of the second image (e.g., based on the difference graph). The image difference data can include the information associated with position, size, brightness difference, color difference of a difference area, a position, size, brightness, color, etc. of the difference area in the original area, etc.

The first image can be an image of the target object acquired before the projection information was modified. The second image can be an image of the target object acquired after the projection information was modified. Image data associated with different areas of the first image and the second image (e.g., image variation results in different areas) can be obtained (e.g., extracted from the respective first image and the second image), and comparing such image data obtained from the first image and the second image, obtaining image difference data between the image variation results of the different areas in the first image and the second image is possible.

As an example, in the event that the target object corresponds to a human face or a photograph thereof, the different areas of the first image and second image can be the facial area and the background area, respectively.

The target object can be a living object or a photograph or video image of a living object or a virtual object simulated by simulation software. A living object is a three-dimensional entity. In contrast, a virtual object is generally a two-dimensional image. Therefore, after the projection information projected onto the target object is modified, a substantial difference in the projection feedback of a living object as opposed to a virtual object will be apparent. Thus, image difference data feedback from a target object can be used to determine whether the current target is a living object (e.g., the face of a real person) or a virtual object (e.g., a photograph or video containing a person's face).

As an example, in the event that the target object corresponds to a face or a photograph thereof, if the target object is the face of a person, then the person's face in the second image acquired by a front camera of a terminal (e.g., a smart phone) will vary in brightness as the brightness of the display screen varies (e.g., as a result of the projection information being modified from a time when the first image is captured and a time when the second image is captured). In the event that the target object corresponds to a photograph of a person's face, then the person's face in the second image (e.g., photograph of the person's face) acquired by the front camera of a terminal (e.g., a smart phone) will not co-vary in brightness.

In some embodiments, the image difference data indicates a manner or extent to which the first image (or an object therein) differs from the second image (or an object therein). The image difference data can comprise information from which an extent to which the first image differs from the second image can be derived. Conversely, in some embodiments, the image difference data can indicate a manner or extent to which the first image and the second image are similar, etc.

At 440, it is determined whether the target object is a virtual object. It can be determined whether the target object is a virtual object based at least in part on the image difference data. For example, determination of whether the target object is a virtual object can be based at least in part on a difference (or an extent of a difference) between at least a part of the first image and a part of the second image. As another example, determination of whether the target object is a virtual object can be based at least in part on a determination of whether a difference between at least a part of the first image and at least a part of the second image is consistent with (e.g., matches) a modification to the projection information (or a difference between projection information projected at a time when the first image is captured and projection information projected at a time when the second image is capture). The target object can be determined to be a virtual object in the event that the image difference data indicates (or from which such an indication can be derived) that a difference between at least a part of the first image and a part of the second image exceeds a threshold difference (e.g., whether a degree or extent of a difference exceeds a threshold value).

In some embodiments, in the event that the target object is determined to not be a virtual object (e.g., if the target object is determined to be a real object), then authentication can proceed. For example, determination of whether the target object is a virtual object can be part of an authentication process. In some embodiments, in the event that the target object is determined to be a virtual object, then an authentication associated with the target object can be declined, or an authentication process can otherwise be ended.

The virtual object can be a two-dimensional image or a three-dimensional model of the target object. After the first image of the target object and second image of the target object are acquired with a video device (or another image capturing device), the image difference data (e.g., brightness variation values) of (or between) the first image and the second image are compared, and it is thereby possible to determine whether the target object is a virtual object. The determination of whether the target object is a virtual object can be based on whether a difference between the first image and the second image is inconsistent with the updating of the projection information. The difference between the first image and the second image can be inconsistent if the difference between the first image and the second image does not match the updating of the projection information. For example, in the event that the screen enhances the brightness (in connection with updating the projection information), the second image can be darker than the first image. As another example, in the event that the screen enhances the brightness (in connection with updating the projection information), areas of the second image corresponding to a reflection from an eye of the target object should have a corresponding update; if the reflection from the eye does not result in a different reflection or a change in a characteristic of the reflection, the target object can be deemed to be a virtual object. As another example, in the event that the screen changes the brightness (in connection with updating the projection information), and the projection information is updated to have a reduced level of brightness, then such an update to the projection information should be represented in a difference between the first image and the second image; if the second image represents a brightness that is brighter than a brightness of the first image, and the update to the projection information is an increase in brightness, then the target object can be determined to be a virtual object. As another example, in the event that the screen changes the image being projected (in connection with updating the projection information), and the projection information is updated to have a change in size of a picture being projected, then such an update to the projection information should be represented in a difference between the first image and the second image; if the second image represents a picture that does not have size that is different than a size of the corresponding picture represented in the first image, or if a difference in size is not sufficient (e.g., does not exceed one or more thresholds determined based on an updating of the projection information), then the target object can be determined to be a virtual object.

The virtual object can be a photograph of the target object or a three-dimensional model (such as a wax likeness), a video, slides of consecutive pictures, or images synthesized from photograph-based software simulations and containing actions.

According to various embodiments, when projection information is projected onto a target object, a first image obtained from the current capturing of the target object is acquired. After the projection information is modified, a second image obtained from capturing the target object is acquired when updated projection information is being projected. The first image and the second image are compared, and image difference data is acquired. The image difference data serves as a basis for determining whether the target object is a virtual object.

According to various embodiments, the content currently projected onto the target object is modified (e.g., updated) to modify the content displayed on a display screen or the screen parameters of the display screen and the modification results (e.g., resulting projection information) are projected onto the target object. Then, a video device (or other image capturing device) is used to capture a first image of the target object and a second image of the target object before and after the data is changed for projecting onto the target object. The image difference data can serve as a basis for determining whether the current target object is a virtual object. The image difference data can be computed based on a difference between data of the first image and data of the second image. According to various embodiments, changing (e.g., updating) the content projected onto the target object will change the content shot during the process of capturing the target object. Fraudulent content used by a malicious party in connection with a fraudulent authentication attempt (such as prerecording video of corresponding actions, showing slides of consecutive pictures, images of actions such as head-nodding or shaking or eye-blinking synthesized through computer simulations) is generally two-dimensional images. A 3D model can also be used by malicious parties in connection with fraudulent authentication attempts. Therefore, when the projection information projected onto the two-dimensional image is modified, there will be no difference between the change results for any two areas within the two-dimensional images. Thus, according to various embodiments, determining whether a target object is a virtual object can be based at least in part on a determination of whether the target object is a two-dimensional image (e.g., a virtual object). In some embodiments, it is possible to determine, after continually (or periodically) testing the modified projection information, the following: if there exists a difference between the image variation results of different areas in the first image and the second image that were captured, then the target object is not a virtual object, but rather a living entity object. According to various embodiments, detection of a living-thing (e.g., whether the target object corresponds to a real person) can be made based on real-time feedback of the target object to display changes. Accordingly, accuracy of live human-face detection can be improved and malicious attacks by virtual objects on authentication systems (e.g., fraudulent authentication attempts) can be reduced.

Various embodiments solve the technical problem of existing live recognition-based authentication systems that are vulnerable to video or image attacks (e.g., fraudulent authentication attempts), in which illegitimate users make use of the simulated actions of legitimate users by employing live actions to implement recognition.

In some embodiments, when a terminal activates an authentication function, the projection information is projected by the display screen of the terminal device. The projection information comprises content displayed by the display screen and the projection information is updated by updating the display content of the display screen.

The terminal can be a smartphone, a tablet computer, a notebook computer, or other smart device. It could also be a device (such as a desktop computer) externally connected to a video camera means. For example, in the event that the terminal is a smartphone, the display screen can be the display screen of a smartphone. When the terminal device activates the authentication function, projection information is projected by the display screen of the terminal. The projection information can be content (such as pictures or text) displayed on an electronic display screen or parameter information (such as the brightness or color displayed by the display screen) displayed on an electronic display screen. In some embodiments, the projection information can be information projected on the target object by another device (e.g., a device different from the device that captures the first image and/or the second image, or a device different from the device that determines whether the target object is a virtual object). Such other device can cause the target object to present different variations. For example, the angle of the light source and the camera angle can be different, and thus, can produce different changes. If the projection device is positioned on the left relative to the target object, will cause the left side of the target object (e.g., a face) to have changes in certain characteristics (e.g. brightness) changes different than the right side of the target object.

In some embodiments, a first image comprises at least: a first facial image and a first background image of the target object when projecting the first projection information, and a second image comprises at least: a second facial image and a second background image of the target object when projecting the second projection information. The projection information can comprise one or more of projection brightness, projection color, projection graphics, etc.

The projection information can comprise at least one of the following: projection brightness, projection color, and projection graphics. The first projection information can correspond to projection information prior to modification (e.g., projection information that is projected before being updated for capturing of the second image). The second projection information can be projection information following modification (e.g., projection information that is projected after being updated for capturing of the second image). The first image can be an image of the target object captured before the projection information is modified (e.g., updated) and can include a first facial image and a first background image of the target object when the first projection information is being projected. The second image can be an image of the target object acquired after the projection information is modified (e.g., updated) and can include a second facial image and a second background image of the target object when the second projection information is being projected.

According to various embodiments, determining whether a target object is a living object or a virtual object is possible.

According to various embodiments, determining whether a target object is a virtual object based at least in part on image difference data comprises: determining that the target object is a virtual object if the image difference data is null. The image difference data being null represents the fact that the image data of the first image and of the second image are the same.

According to various embodiments, in the event that image difference data serves as a basis for determining whether a target object is a virtual object, if the image difference data is determined to be null (e.g., the first and second images have the same image data, and there is no image difference data), the determination can be made that the target object is a virtual object. If the difference data is determined to not be null (e.g., the first and second images do not have entirely identical data, and there exists image difference data), the determination can be made that the target object is a living object.

According to various embodiments, determining whether the target object is a virtual object based at least in part on the image difference data comprises one or more of the following:

Technique 1: Image difference data includes: a first degree of variation obtained based on comparing the first facial image to the second facial image, and a second degree of variation obtained based on comparing the first background image to the second background image. The image difference data is used as a basis for determining whether the target object is a virtual object, and the determining of whether the target object is a virtual object comprises: in the event that the projection information is projection brightness and/or projection color, determining that the target object is a virtual object if the first degree of variation is the brightness variation value and/or the color variation value of the entire face, and the difference between the first degree of variation and the second degree of variation falls within a first predetermined range of variation. If the projection information projected onto the target object is modified, the first degree of variation is determined by recording the facial image obtained by capturing the target object, and the second degree of variation is determined by capturing the background image in which the target object is located.

In technique 1, when the projection information is projection brightness and/or projection color, the projection brightness can be the brightness displayed by a display screen; the projection color can be the color displayed by a display screen; the first facial image can be the facial image recorded from capturing the target object before the brightness or color of the display screen changed; the second facial image can be the facial image recorded from capturing the target object after the brightness or color of the display screen changed; the first background image can be the background image obtained from capturing the background in which the target object was located before the brightness or color of the display screen changed; the second background image can be the background image obtained from capturing the background in which the target object is located after the brightness or color of the display screen changed; a first degree of variation can be obtained by comparing the first facial image with the second facial image; and a second degree of variation can be obtained by comparing the first background image with the second background image. The first degree of variation and the second degree of variation serve as the basis for determining whether the target object is a virtual object; if the first degree of variation is the brightness variation value and/or color variation value of the entire face, and if the difference between the first degree of variation and the second degree of variation falls within a first predetermined range of variation, then the target object is determined to be a virtual object.

The technique 1 uses partial brightness variation of images as a basis for determining whether a target object is a virtual object. Because the brightness of a display screen varies, the degrees of brightness variation of the face portion and background portion in picture brightness acquired by a video camera in real time will have the following differences: the brightness variation of the face portion of a real person will be more apparent because the distance from the face portion of the real person to the display screen will not be the same, but the brightness variation of the background portion will not be apparent. As for pictures, video, software simulation, and other such methods, the distances from the display screen of the face portion and the background portion will be basically dissimilar, but the degree of brightness variation will be the same.

Technique 2: Image difference data includes: a first degree of variation obtained based on comparing the first facial image to the second facial image and a second degree of variation obtained based on comparing the first background image to the second background image. The first facial image and the second facial image comprise characteristic information on at least one biological characteristic of the target object face. Image difference data is used as a basis for determining whether the target object is a virtual object, and the determining of whether the target object is a virtual object comprises: in the event that the projection information is projection brightness and/or projection color, determining that the target object is a virtual object if the first degree of variation is the brightness variation value and/or the color variation value of any one or more biological characteristics of the face, and if the difference between the first degree of variation and the second degree of variation falls within a second predetermined range of variation. If the projection information projected onto the target object is modified, the first degree of variation is determined by recording the facial image obtained by capturing the target object, and the second degree of variation is determined by capturing the background image in which the target object is located.

In the technique 2, the biological characteristics can be inherent physiological characteristics of the target object face, which could include eye characteristics, mouth characteristics, eyebrow characteristics, ear characteristics, nose characteristics, skin characteristics, etc. In some embodiments, the eye characteristics could include: pupil characteristics, iris characteristics, and eyeball characteristics. When the projection information is projection brightness and/or projection color, the first facial image can be the facial image recorded from capturing the target object before the brightness or color of the display screen changed. The first facial image includes characteristic information on at least one biological characteristic of the target image face. The second facial image can be the facial image recorded from capturing the target object after the brightness or color of the display screen changed. The second facial image includes characteristic information on at least one biological characteristic of the target image face. The first background image can be the background image obtained from capturing the background in which the target object was located before the brightness or color of the display screen changed. The second background image can be the background image obtained from capturing the background in which the target object is located after the brightness or color of the display screen changed. A first degree of variation can be obtained based on comparing the first facial image with the second facial image. A second degree of variation can be obtained based on comparing the first background image with the second background image. In some embodiments, the first degree of variation and the second degree of variation serve as the basis for determining whether the target object is a virtual object. For example, if the first degree of variation is the brightness variation value and/or color variation value of any one or more biological characteristics of the face, and if the difference between the first degree of variation and the second degree of variation falls within a second predetermined range of variation, then the target object is determined to be a virtual object.

In some embodiments, the biological characteristics comprise skin characteristics. As an example of a target object that is a face or a photograph thereof, if the target object is the facial skin of a person, then the person's facial skin in the second image captured by a front camera of a terminal (e.g., a phone) will vary in brightness as the brightness of the display screen varies. If the target object is a photograph of a person's face, then the person's facial skin in the second image (e.g., photograph of the person's face) captured by the front camera of the terminal will not co-vary in brightness.

In some embodiments, determination of whether a target object is a virtual object is based on the degree of brightness variation of the various parts of a face (e.g., in the event that the target object is a face). As the brightness and/or color of the display screen varies, there will be a difference in the degree of brightness and/or color between the face portion and the background portion in the brightness of a picture acquired in real time by a video camera. In the event of a real person, the brightness variation between high-intensity light portions and low-intensity light portions of the face will be dissimilar because of the face's 3D structure. In the event of a picture, video, software simulation, or other such method, the brightness variation pattern of the various portions of the face will differ from that of a real person because of its flat structure.

Technique 3: The image difference data includes: an image variation value for at least one biological characteristic in a first facial image and a second facial image. The image difference data is used as a basis for determining whether the target object is a virtual object, and the determining of whether the target object is a virtual object comprises: in the event that the projection information is projection brightness and/or projection color, obtaining the brightness variation values and/or color variation values of any two biological characteristics. If the image variation values of any two or more biological characteristics fall within a third predetermined variation range, then the target object is determined to be a virtual object, wherein, if the projection information projected onto the target object is modified, the image difference data is determined by recording the characteristic image obtained from capturing at least one biological characteristic of the target object face.

In the technique 3, the first facial image can be the facial image obtained by recording and capturing the target object before the display screen modifies the brightness or color. The first facial image can include characteristic information on at least one biological characteristic (e.g., eyes, mouth, etc.) of the target object face. The second facial image can be the facial image obtained by recording and capturing the target object after the display screen modifies the brightness or color. The second facial image includes characteristic information on at least one biological characteristic (e.g., eyes, mouth, etc.) of the target object face. When the projection information comprises projection brightness and/or projection color, the brightness variation value and/or the color variation value of any two biological characteristics can be obtained by the video device. If the image variation values of any two or more biological characteristics fall within a third predetermined variation range, then the target object is determined to be a virtual object.

According to various embodiments, it is determined whether the target object is a virtual object based on the degree of brightness and/or color variation of at least one biological characteristic (e.g., eyes, mouth, etc.) of a human face. As the brightness and/or color of the display screen varies, the brightness and/or color of the eyes and mouth acquired in real time by the video camera will vary accordingly.

Technique 4: The projection information comprises: projection graphics. In the event the biological characteristic is an eyeball, the image difference data can comprise the image variation value of the biological characteristic in the first facial image and the second facial image. The image variation can comprise the variation value of the image content reflected by the eyeball. If the variation value of the image content lies within a predetermined range (e.g., a fourth predetermined variation range), then the target object is determined to be a virtual object.

In the technique 4, characteristics of a graphic projected in (e.g., onto) an eyeball serve as a basis for determining whether the target object is a virtual object. For example, it can be determined whether a target object is a virtual object based on a graphic shape projected in an eyeball (e.g., based on a capturing of an image that includes a reflection of at least a part of the graphic projected onto the eyeball). The first facial image can be a facial image obtained by recording and capturing the target object while the display screen displays a first graphic. The first facial image includes image content information on the first graphic reflected from the target object eyeball. While the display screen displays a second graphic, the second facial image can be a facial image obtained by recording and capturing the target object. The second facial image includes image content information on the first graphic reflected from the target object eyeball. The projection information can include projection graphics. In the event that the biological characteristic is (or comprises) an eyeball, variation in the image content reflected from the eyeball in the first facial image and second facial image is obtained by the video device. If the image content is the same (e.g., if the image content of the first facial image and the image content of the second facial image match), then the target object is determined to be a real person. If the target objects are dissimilar or if the image content are not the same (e.g., if the image content of the first facial image and the image content of the second facial image match), then the target object is determined to be a virtual object.

A wax likeness or other three-dimensional model can have human characteristics such as skin and a face with a 3D structure. Therefore, such a wax likeness or other three-dimensional model can be used in connection with a malicious attempt for authentication to a system based on the three techniques (e.g., technique 1, technique 2, and technique 3) described above. A real person's eyeball is generally spherical and will reflect the image in front of the person's face. However, a picture, video, software simulation, or other such method will not reflect the image in front of the person's face. As the brightness, colors, and shapes of a display screen vary, the images reflected by a real person's eyeball will also vary. Accordingly, determination of whether the target object is a real person can be based on detecting the image of the eyeball portion of the facial image.

According to various embodiments, differences between two captured images can be perceived (e.g., detected). As illustrated in FIGS. 5A and 5B, projection information can be changed and corresponding images can be captured. In FIG. 5A, a lighter screen can be displayed (e.g., projected) from the display screen. In contrast, in FIG. 5B, a darker screen can be displayed (e.g., projected) from the display screen. Accordingly, face 550 can be darker than face 500. A difference in the brightness of face 550 and the brightness of face 500 can be detected. In some embodiments, information can be reflected by at least part of the target object. For example, an image of the target object can capture information being reflected. As illustrated in FIG. 5A, eyes 503 can reflect certain information that is projected onto the target object. The certain information being reflected can include content such at least part of an image being projected. In some embodiments, the information reflected from the eyes can be light or an indication of a brightness of the projection information. In contrast, in the event that the projection information is updated to have a darker level of brightness, information projected may not be reflected by the target object, or a different type of extent of information from the projection information may be reflected. As illustrated in FIG. 5B, eyes 553 do not include the same reflected content as eyes 503 of FIG. 5A. In some embodiments, a brightness variation value is computed based on a brightness of face 550 of FIG. 5B and a brightness of face 500 of FIG. 5A.

According to various embodiments, preventing a malicious party from using a three-dimensional model (such as a wax likeness) of a legitimate user in connection with a malicious or fraudulent authentication attempt to an authentication system can occur and thus the security of an authentication system based on living-thing recognition is improved.

Figure 6:
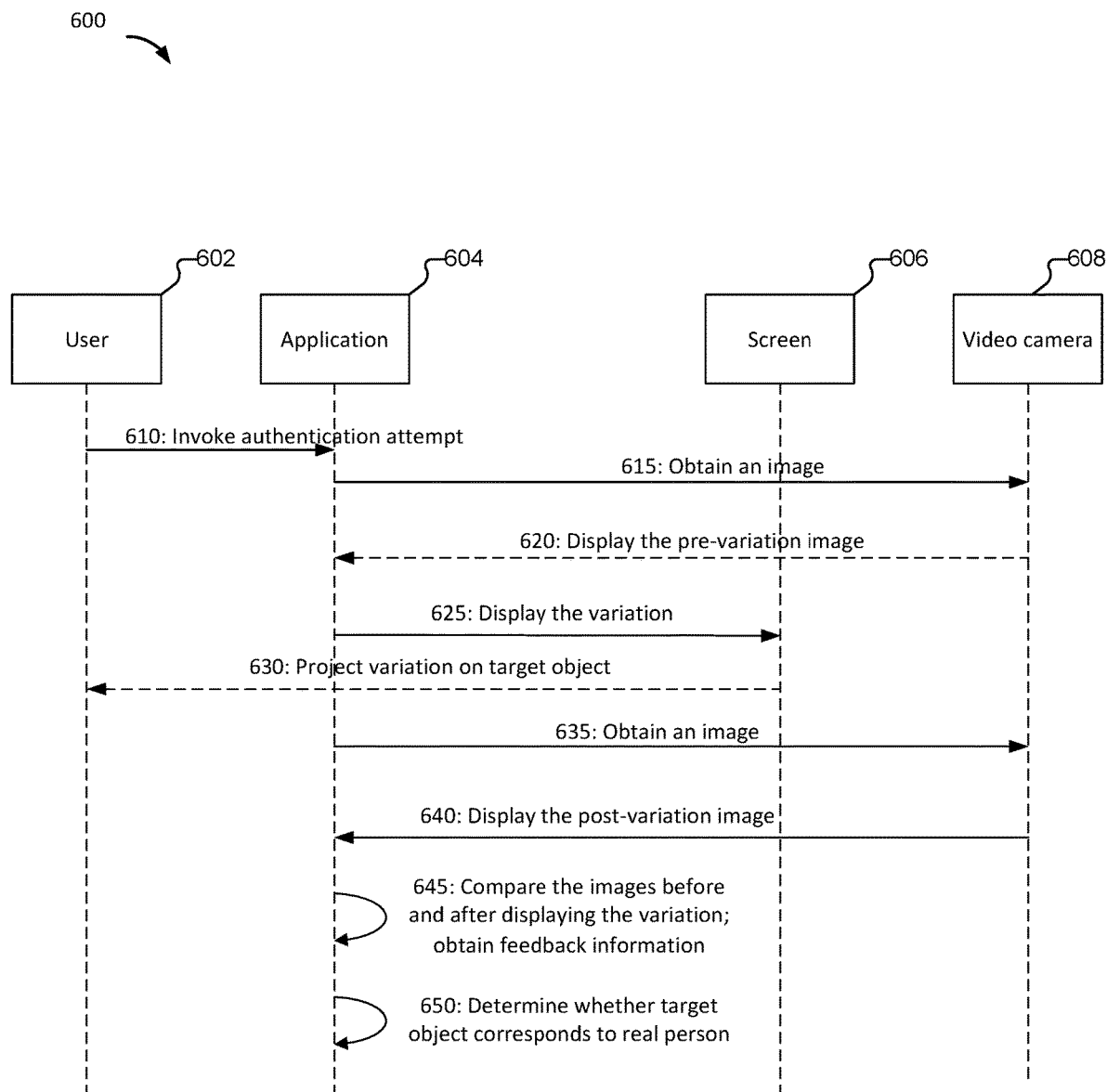
FIG. 6 is an interaction diagram of a method for a facial recognition-based authentication system according to various embodiments of the present application.

FIG. 6 is an interaction diagram of a method for a facial recognition-based authentication system according to various embodiments of the present application.

Referring to FIG. 6, process 600 for facial recognition-based authentication is provided. Process 600 can be at least partially implemented by terminal 100 of FIG. 1, terminal 200 of FIG. 2, system 300 of FIG. 3, smartphone 900 of FIG. 9, and/or computer terminal 1000 of FIG. 10. Process 600 can be implemented in connection with process 400 of FIG. 4, process 700 of FIG. 7, and/or process 800 of FIG. 8.

Process 600 can include authentication of a target object (e.g., user 602) in connection with an authentication attempt to an authentication system. The authentication system can comprise a display device (e.g., screen 606) and an image capturing device (e.g., video camera 608). The authentication system can further comprise a terminal (e.g., a smart phone, etc.). The terminal can execute an application 604 in connection with an authentication attempt.

At 610, an authentication attempt is invoked. Invocation of an authentication attempt can include running application 604 (e.g., on a terminal used by, or otherwise associated with, user 602). For example, user 602 can select to open or execute application 604. In some embodiments, application 604 is opened or otherwise invoked in connection with an authentication of a user 602 to a system (e.g., a system hosted by a server, the terminal, etc.). Invocation of the authentication attempt can include selecting or determining a target position (e.g., a face of user 602) or a target object.

At 615, an image is obtained. The image can be obtained by an image capturing device such as video camera 608. The image capturing device can be comprised in, or otherwise connected to, a terminal used by user 602. For example, video camera 608 can correspond to a front-camera of the terminal (e.g., a camera on a side of the terminal that is the same as the side on which the display of the terminal is located).

As an example, an image of a user target position (e.g., a facial image), is obtained by video camera 608.

At 620, a pre-variation image is displayed. The pre-variation image can correspond to an image that is displayed before projection information is updated (e.g., modified) in connection with the authentication attempt. The pre-variation image can be displayed based at least in part on the target position. For example, after the target position (e.g., of user 602) is obtained, the pre-variation image can be displayed by application 604. For example, application 604 can cause a display device (e.g., a display of the terminal) to display the pre-variation image. The pre-variation image can be captured by video camera 608 and provided to application 604.

At 625, a variation is displayed. For example, the terminal can determine a variation (e.g., update the projection information) and display the variation. An example of a variation a full white screen such that display of the variation causes the display device to project a white screen. In some embodiments, application 604 causes the terminal to display the variation. For example, application 604 can determine the variation, or receive the variation (e.g., from an authentication application, a server, etc.), and can cause the terminal to display the variation on screen 606. The pre-variation image can be displayed based at least in part on the target position. For example, after the target position (e.g., of user 602) is obtained, the pre-variation image can be displayed by application 604.

At 630, the variation is projected onto the target object (e.g., user 602). For example, the variation included in information displayed by screen 606 or caused by a variation in a display from screen 606 can be projected onto at least a portion of the target object (e.g., onto an eyeball of user 602).

At 635, an image (e.g., a second image) is obtained. The image can be obtained by an image capturing device such as video camera 608. The image capturing device can be comprised in, or otherwise connected to, a terminal used by user 602. For example, video camera 608 can correspond to a front-camera of the terminal (e.g., a camera on a side of the terminal that is the same as the side on which the display of the terminal is located).

In some embodiments, after the change (e.g., an update to the projection information) is made to the display screen display (including, but not limited to, changing the brightness, displaying different colors, and displaying different shapes), an image of the target object (e.g., the target position such as the user target position) is captured by the image capturing device (e.g., video camera 608) connected to the terminal device. The image capturing device can correspond to a front camera of the terminal.

At 640, a post-variation image is displayed. The post-variation image can correspond to an image that is displayed after projection information is updated (e.g., modified) in connection with the authentication attempt. The post-variation image can be displayed based at least in part on the target position. For example, after the target position (e.g., of user 602) is obtained, the pre-variation image can be displayed by application 604. For example, application 604 can cause a display device (e.g., a display of the terminal) to display the pre-variation image. The post-variation image can be captured by video camera 608 and provided to application 604.

In some embodiments, the user target position image that was obtained after the display screen projection information was modified is output.

At 645, the image obtained before the variation (e.g., the first image) and the image obtained after the variation (e.g., the second image) are compared. For example, image data from the image obtained before the variation can be compared with image data from the image obtained after the variation. In some embodiments, feedback information can be obtained based on the comparison of the image obtained before the variation with the image obtained after the variation. The feedback information can correspond to a result of the comparison of the image obtained before the variation with the image obtained after the variation At 650, it is determined whether the target object corresponds to a real person. For example, it is determined whether user 602 is a real person. In some embodiments, application 604 determines whether user 602 is a real person. Determining whether the target object corresponds to a real person can be based on the comparison of the image obtained before the variation and the image obtained after the variation. For example, determination of whether the target object corresponds to a real person can be based on a result of 645.

In the event that the target object is determined to correspond to a real person at 650, process 600 can further comprise authenticating the user. The user can be authenticated according to one or more authentication technologies. For example, the user can be authenticated based on an input of a user identifier and token or password, and comparison of such user identifier and token or password with information stored in connection with a registration of the user. As another example, the identity of the user can be confirmed based on comparison of a picture of the user (e.g., the first image, the second image, or another image contemporaneously captured with process 600) and a reference picture that is stored in association with a registration of the user. Based on the authentication of the user, the user can be granted access to a domain (e.g., a terminal, a network resource, etc.) or to a service (e.g., a web service for which the user is authenticated) associated with the authentication of the user.

In some embodiments, image data comparison results from before and after the display variation serve as a basis for determining whether user 602 is a real person.

According to various embodiments, the process of living human-face detection comprises changes to the screen display. As an example, changes to the screen display comprise, but are not limited to, changing the brightness, displaying different colors, and displaying different shapes. After a change to the screen display, feedback to the display variation in the images is obtained by the image capturing device (e.g., the video camera). The feedback can include, but is not limited to: whether real-time image brightness varies with the display brightness, whether real-time image color varies with the display color, whether the image reflected by the eyeballs shows the currently displayed shape, etc. There is a difference between a human face's feedback to a display and the feedback of a picture, video, or computer simulation to a display. The feedback can be used to determine whether the target object (e.g., the user) is a real person and to improve security.

Various embodiments provide a method for improving living-face detection. Effectiveness of living-face detection can be improved if such methods for living-face detection are combined with action recognition detection commonly used in living-thing detection according to related art.

Please note that all the method embodiments described above have been presented as a series of a combination of actions in order to simplify the description. However, persons skilled in the art should know that the present invention is not limited by the action sequences that are described, for some of the steps may make use of another sequence or be implemented simultaneously in accordance with the present invention. Furthermore, persons skilled in the art should also know that the embodiments described in the Description are preferred embodiments and that the actions and modules involved therein are not necessarily required by the present invention.

Through descriptions of the above implementations, persons skilled in the art can clearly understand that methods based on the embodiments may be realized through software with the necessary general-use hardware platform. Of course, hardware may also be used, but in many cases the former is the preferred implementation. Based on such an understanding, the techniques of the present invention, whether intrinsically or with respect to portions that contribute to the prior art, are realizable in the form of software products. These computer software products can be stored on storage media (such as ROM/RAM, magnetic disks, and optical disks) and include a certain number of commands used to cause a piece of terminal equipment (which can be a mobile phone, a computer, a server, or network equipment) to execute the methods of the present invention embodiments.

Various embodiments provide a facial recognition-based authentication method. Please note that the steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those here.

The facial recognition-based authentication method can be executed in a computer device, a mobile device, or similar operating means. For example, a facial recognition-based authentication method can be performed by terminal 100 of FIG. 1.

Figure 7:
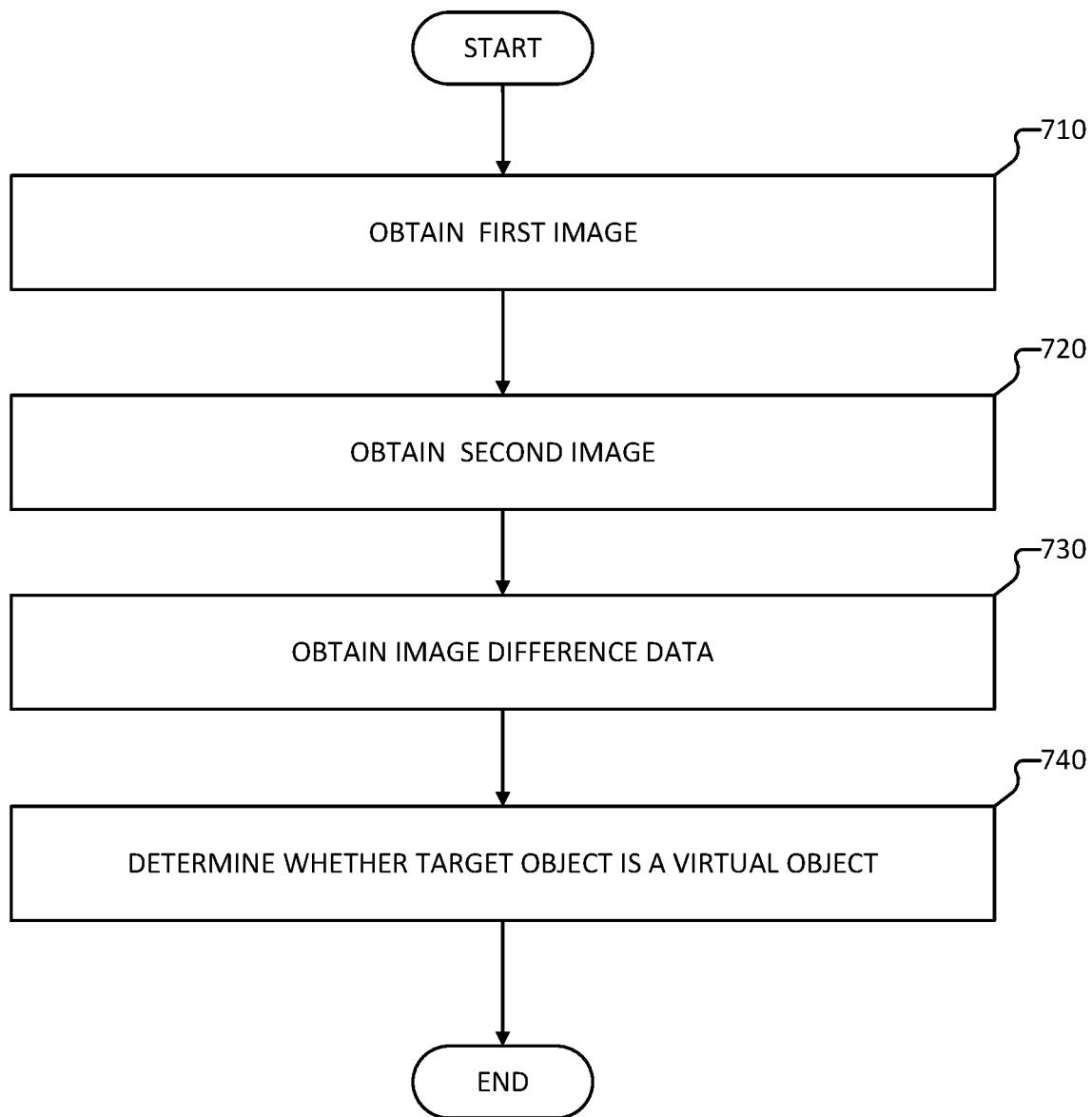
FIG. 7 is a flowchart of a method for facial recognition-based authentication according to various embodiments of the present application.

FIG. 7 is a flowchart of a method for facial recognition-based authentication according to various embodiments of the present application.

Referring to FIG. 7, process 700 for facial recognition-based authentication is provided. Process 700 can be at least partially implemented by terminal 100 of FIG. 1, terminal 200 of FIG. 2, system 300 of FIG. 3, smartphone 900 of FIG. 9, and/or computer terminal 1000 of FIG. 10. Process 700 can be implemented in connection with process 400 of FIG. 4, process 600 of FIG. 6, and/or process 800 of FIG. 8.

At 710, a first image is obtained. The obtaining of the first image can include capturing the first image by an image capturing device such as a video camera, etc. In some embodiments, the image capturing device is a front-camera on a terminal such as a smart phone. The first image can correspond to an image of the current target object after projecting projection information onto the target object through a display screen.

The display screen can be the display screen of a smart terminal device. The projection information can be information displayed through the display screen. The target object can be any object for which image information is to be acquired through a video device (e.g., the image capturing device). After projection information is projected onto the target object through the display, the first image obtained from current capturing of the target object is acquired.

According to various embodiments, the display screen is the display screen of a smartphone, a tablet computer, a notebook computer, a desktop computer, or other externally connected display device.

At 720, a second image is obtained. The obtaining of the second image can include capturing the second image by an image capturing device such as a video camera, etc. In some embodiments, the image capturing device is a front-camera on a terminal such as a smart phone. The second image can be obtained after projection information displayed by the display screen is modified (e.g., updated). After the projection information to be displayed on the display screen is modified, the second image is captured. The second image can correspond to an image of the target object with the projection information updated.

According to various embodiments, after the projection information (e.g., color or brightness) of the display screen is modified, a second image of the target object is obtained by an image capturing device such that the second image is based on the projection information that is updated.

In some embodiments, the image capturing device can be a video camera connected to the display screen via a parallel port or USB. The image capturing device can be the front camera of a smartphone, a tablet computer, or a notebook computer or a video camera externally connected to a desktop computer.

At 730, image difference data is obtained. The image difference data can be obtained based at least in part on the first image and the second image. For example, the image difference data can be obtained based on a comparison of the first image and the second image. In some embodiments, the image difference data is obtained based on a comparison of image data for the first image with image data for the second image. The terminal can compare the first image and the second image in connection with obtaining the image difference data. Determination of the image difference data can include detecting and locating a target object in a first image and a second image, comparing an area of the first image that includes the target object with an area of the second image that includes the target object, generate a difference graph (or other representation) based on the comparison, compute the difference between one or more characteristics (e.g., brightness, color, etc.) of the first image and the second image, detect a difference area in the difference graph, and determine results associated with the difference area.

The first image can be an image of the target object acquired before the projection information was modified. The second image can be an image of the target object acquired after the projection information was modified. Image difference data for the first image and the second image is acquired by comparing the first image and the second image.

At 740, it is determined whether the target object is a virtual object. The determination of whether the target object is a virtual object can be based on the image difference data. For example, the result of the comparison of the first image and the second image can be used in connection with determining whether the target object is a virtual object.

According to various embodiments, the image difference data (e.g., brightness variation values) is determined (e.g., computed). The image difference data can be determined based on a comparison of the first image and the second image. For example, image data for each of the first image and the second image is compared to obtain the image difference data. Thus, it is possible to determine whether the target object is a virtual object.

The virtual object can be a photograph of the target object or a three-dimensional model (such as a wax likeness), a video, slides of consecutive pictures, or images synthesized from photograph-based software simulations and containing actions.

According to various embodiments, in the event that projection information is projected onto a target object, a first image obtained from the current capturing of the target object is acquired. After the projection information is modified, a second image obtained from capturing the target object is acquired when updated projection information is being projected. The first image and the second image are compared, and image difference data is acquired. The image difference data serves as a basis for determining whether the target object is a virtual object.

In some embodiments, modifying the content currently projected onto the target object (e.g., modifying the projection information) comprises modifying the content displayed on a display screen or the screen parameters of the display screen and projecting the modification results onto the target object. Then, an image capturing device (e.g., a video camera, a front camera on a terminal, etc.) is used to obtain a first image and a second image of the target object before and after the data (e.g., the content displayed on the display screen) is changed for projecting onto the target object. The image difference data of the first image and the second image serves as a basis for determining whether the current target object is a virtual object. For example, image difference data corresponding to a difference between the first image and the second image is used in connection with determining whether the target object is a virtual object. Changing the content projected onto the target object will change the content shot during the process of capturing the target object. Content that can be used in a malicious or fraudulent authentication attempt (such as prerecording video of corresponding actions, showing slides of consecutive pictures, images of actions such as head-nodding or shaking or eye-blinking synthesized through computer simulations) employed by attackers is generally two-dimensional images. Therefore, when the projection information projected onto the two-dimensional image is modified, there will be no difference between the change results for any two areas within the two-dimensional images. For example, image difference data corresponding to images captured in the event that the target object is a virtual object (e.g., a prerecording video of corresponding actions, showing slides of consecutive pictures, images of actions such as head-nodding or shaking or eye-blinking synthesized through computer simulations) will indicate that the first image and the second image match. According to various embodiments, it is possible in the process of determining whether a target object is a virtual object to use image difference data to determine whether the target object is also a two-dimensional image (e.g., a virtual object). In some embodiments, it is possible to determine, after dynamically or periodically testing the modified projection information (e.g., obtaining corresponding images before and after modifying projection information), the following: if there exists a difference between the image variation results of different areas in the first image and the second image that were captured, determining that the target object is not a virtual object, but rather a living entity object. For example, various embodiments provide living-thing detection based on real-time feedback of the target object to display changes and thus improve live human-face detection accuracy and reduce malicious or fraudulent attempts for authentication by virtual objects on authentication systems.

Various embodiments improve on existing live recognition-based authentication systems that are vulnerable to video or image attacks, in which malicious users make use of the simulated actions of legitimate users by employing live actions to implement recognition.

Please note that all the method embodiments described above have been presented as a series of a combination of actions in order to simplify the description. However, persons skilled in the art should know that the present invention is not limited by the action sequences that are described, for some of the steps may make use of another sequence or be implemented simultaneously in accordance with the present invention. Furthermore, persons skilled in the art should also know that the embodiments described in the Description are preferred embodiments and that the actions and modules involved therein are not necessarily required by the present invention.

Through descriptions of the above implementations, persons skilled in the art can clearly understand that methods based on the embodiments may be realized through software with the necessary general-use hardware platform. Of course, hardware may also be used, but in many cases the former is the preferred implementation. Based on such an understanding, the technical scheme of the present invention, whether intrinsically or with respect to portions that contribute to the prior art, is realizable in the form of software products. These computer software products can be stored on storage media (such as ROM/RAM, magnetic disks, and optical disks) and include a certain number of commands used to cause a piece of terminal equipment (which can be a mobile phone, a computer, a server, or network equipment) to execute the methods of the present invention embodiments.

Various embodiments provide a facial recognition-based authentication method. Please note that the steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those here.

The facial recognition-based authentication method can be executed in a mobile device, a computer device, or similar operating means. For example, a facial recognition-based authentication method can be performed by terminal 100 of FIG. 1.

Figure 8:
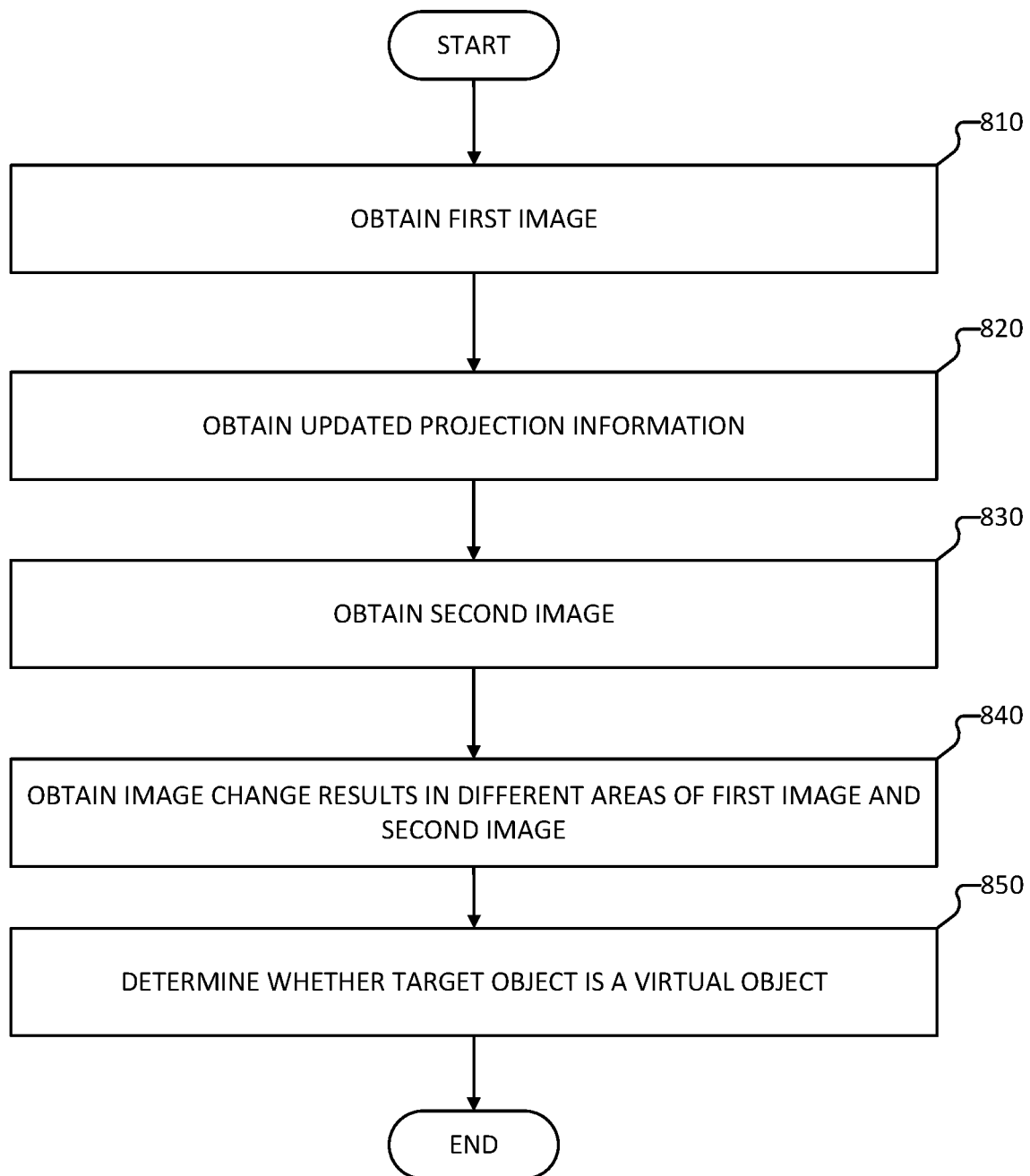
FIG. 8 is a flowchart of a method for facial recognition-based authentication according to various embodiments of the present application.

FIG. 8 is a flowchart of a method for facial recognition-based authentication according to various embodiments of the present application.

Referring to FIG. 8, process 800 for facial recognition-based authentication is provided. Process 800 can be at least partially implemented by terminal 100 of FIG. 1, terminal 200 of FIG. 2, system 300 of FIG. 3, smartphone 900 of FIG. 9, and/or computer terminal 1000 of FIG. 10. Process 800 can be implemented in connection with process 400 of FIG. 4, process 600 of FIG. 6, and/or process 700 of FIG. 7.

At 810, a first image is obtained. The obtaining of the first image can include capturing the first image by an image capturing device such as a video camera, etc. In some embodiments, the image capturing device is a front-camera on a terminal such as a smart phone. The first image can correspond to a first image of the current target object. The first image can be captured with a mobile device.

The mobile device can be a smartphone, a tablet computer, a notebook computer, or other such smart device having a video camera. The target object can be any object for which image information is to be acquired through an image capturing device (e.g., a video camera). The current image of the target object can be acquired by the video camera of the mobile device and serve as the first image.

In some embodiments, the terminal is a smartphone.

At 820, updated projection information is obtained. The projection information can be updated after the first image is obtained. The projection information can be updated to change content being displayed by the terminal or to change a manner by which the content is displayed by the terminal (e.g., changing the color of the content, changing the brightness of the display, etc.). After modifying the display content displayed by the display screen of the terminal (e.g., a mobile device), the projection information to be projected onto the target object by the mobile device is obtained.

In some embodiments, the display screen corresponds to a mobile device's display, which is an input/output device of the mobile device capable of displaying certain electronic information content onto the screen and is a display tool for reflecting such information onto the human eye. The projection information can be content displayed on the display screen. The projection information can be updated by updating the content displayed on the display screen. The display screen can project the projection information in real time.

As an example, in the event that the terminal (e.g., the mobile device) is a smart phone, the modification of the display content of the display screen can be a change in the brightness of the phone screen, the color of the phone screen, the shape of a graphic on the phone screen, or the phone screen's particular content, including text and pictures. With any of the aforesaid modifications, the projection information projected onto the target object can be changed.

The target object can be the face of a person (e.g., a user of the terminal).

At 830, a second image is obtained. The obtaining of the second image can include capturing the second image by an image capturing device such as a video camera, etc. In some embodiments, the image capturing device is a front-camera on a terminal such as a smart phone. The second image can be obtained after projection information displayed by the display screen is modified (e.g., updated).

After the display content displayed by the display screen of the mobile device has been modified and the projection information to be projected onto the target object by the mobile device has been obtained, the projection information is projected onto the target object and an image, which will serve as the second image, of the target object is obtained by the video camera (e.g., a front camera, etc.) of the mobile device.

At 840, image variation results in different areas of the first image and the second image are obtained. In some embodiments, the terminal obtains the image variation results. The obtaining of the image variation results can comprise extracting image variation results in different areas of the first image and the second image. For example, an area of the first image and an area of the second image can be extracted. The area of the first image and the area of the second image that are extracted can correspond to areas in the first image and the second image that comprise a corresponding object or a part of the target object (e.g., an eyeball of the user). Image difference data corresponding to a difference between the first image and the second image can be obtained. For example, the image difference data can be obtained based on a comparing of the first image and the second image. In some embodiments, the image data for the first image and the image data for the second image are compared and based on a result of such a comparison, image difference data is obtained. In some embodiments, the image difference data is determined based on a comparison of area of the first image and the area of the second image that are extracted. As an example, the image difference can be determined on the image variation results, such as the brightness change. If the brightness change in the image variation results is greater than a threshold value, it can be determined the brightness changes. It can be determined whether the brightness changes based on the brightness image variation results.

The first image can be an image of the target object acquired before the projection information was modified. The second image can be an image of the target object acquired after the projection information was modified. After an image capturing device (e.g., a video device) obtains the first image and the second image of the target object, the processor can compare the image data comprised in the first image and the second image to obtain image difference data.

At 850, it is determined whether the target object is a virtual object. The determination of whether the target object is a virtual object can be based on the image difference data. For example, the result of the comparison of the first image and the second image can be used in connection with determining whether the target object is a virtual object.

In some embodiments, after image difference data is obtained by comparing the first image and the second image of the target object before and after the projection is modified, the image difference data serves as a basis for determining whether the target object is a virtual object or a real object (e.g., a real object such as a user). If the image difference data is null, the first image and the second image of the target object are deemed to be the same before and after the projection information was modified and that the corresponding target object is determined to be a virtual object. If the image difference data is not null, the first image and the second image of the target object are deemed to not be the same before and after the projection information was modified and the corresponding target object is determined to be a real object.

As an example in which a target object is a human eye, a large difference exists between the feedback of the human eye to changes in the display content of a display screen and the feedback of pictures, video, or simulation software to changes in the display content of a display screen (e.g., if the target object is a human eye, the feedback from a real eye is different than feedback from a simulated eye). Therefore, the feedback data for a target object can be used as a basis for determining whether the current target object is a true human face or is a simulated object that includes a virtual human face (e.g., containing a photograph or a video of a human face).

According to various embodiments, the display content displayed by a display screen of a mobile device is modified and projected onto a target object. An image capturing device (e.g., a video device) of the mobile device is used to acquire the first image and the second image of the target object before and after display screen changes, and the first image and the second image undergo comparative analysis. Difference data of the first and second images serves as a basis for determining whether the current target object is a virtual object. The changing of the content projected onto the target object will change the content obtained during the process of capturing the target object. Content that can be used in a malicious or fraudulent authentication attempt (such as prerecording video of corresponding actions, showing slides of consecutive pictures, images of actions such as head-nodding or shaking or eye-blinking synthesized through computer simulations) employed by attackers is generally two-dimensional images. Therefore, when the projection information projected onto the two-dimensional image is modified, there will be no difference between the change results for any two areas within the two-dimensional images. For example, image difference data corresponding to images captured in the event that the target object is a virtual object (e.g., a prerecording video of corresponding actions, showing slides of consecutive pictures, images of actions such as head-nodding or shaking or eye-blinking synthesized through computer simulations) will indicate that the first image and the second image match. According to various embodiments, it is possible in the process of determining whether a target object is a virtual object to use image difference data to determine whether the target object is also a two-dimensional image (e.g., a virtual object). In some embodiments, it is possible to determine, after dynamically or periodically testing the modified projection information (e.g., obtaining corresponding images before and after modifying projection information), the following: if there exists a difference between the image variation results of different areas in the first image and the second image that were captured, determining that the target object is not a virtual object, but rather a living entity object. For example, various embodiments provide living-thing detection and identity authentication based on real-time feedback of the target object to display changes and thus improve live human-face detection accuracy and reduce malicious or fraudulent attempts for authentication by virtual objects on authentication systems.

Various embodiments improve on existing live recognition-based authentication systems that are vulnerable to video or image attacks, in which malicious users make use of the simulated actions of legitimate users by employing live actions to implement recognition.

According to various embodiments, again taking the example of a phone as the mobile device and a person's face as the target object, the content (such as text or pictures) displayed by a phone display screen is modified to obtain corresponding projection information, which is projected onto the face. Then, the person's eyeball will reflect the content currently displayed by the phone display screen. Therefore, the information reflected by the person's eyeball will not be the same before and after the content displayed by the phone display screen has changed. Thus, the first image and the second image of the face shot by the phone's video camera before and after the phone changes the content will be different. If the target object is the photograph of a face or is another two-dimensional or three-dimensional model, the first image and the second image of the face shot by the phone's video camera before and after the phone changes the content will be the same. Therefore, various embodiments improve the security of a living thing recognition-based authentication system.

According to various embodiments, a terminal such as a smartphone or tablet is provided for implementing a facial recognition-based authentication method.

Figure 9:
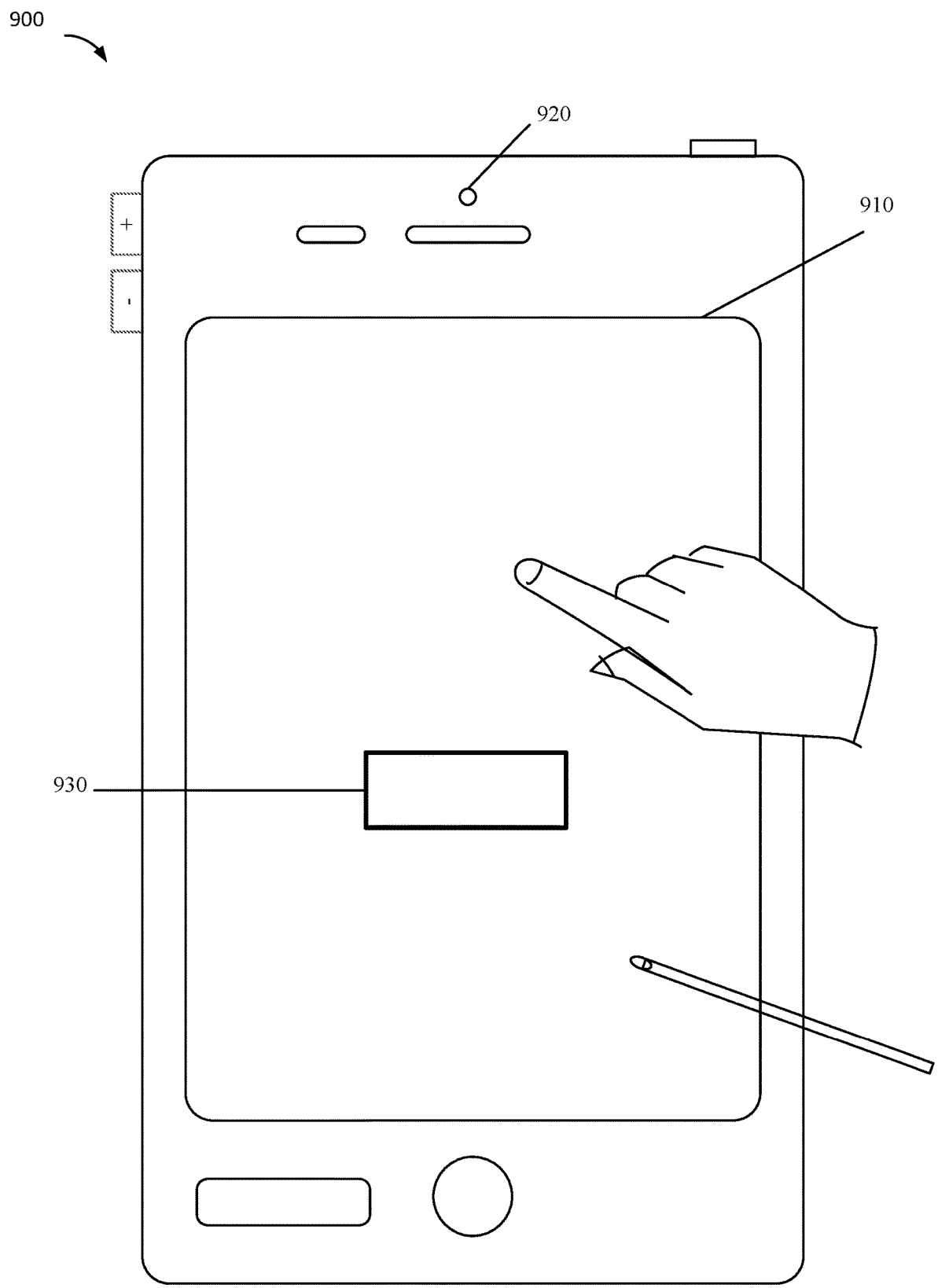
FIG. 9 is a diagram of a smartphone according to various embodiments of the present application.

FIG. 9 is a diagram of a terminal according to various embodiments of the present application.

Referring to FIG. 9, terminal 900 for facial recognition-based authentication is provided. Terminal 900 can be implemented in connection with terminal 100 of FIG. 1, terminal 200 of FIG. 2, system 300 of FIG. 3, and/or computer terminal 1000 of FIG. 10. Terminal 900 can implement, at least in part, process 400 of FIG. 4, process 600 of FIG. 6, process 700 of FIG. 7, and/or process 800 of FIG. 8.

As shown in FIG. 9, terminal 900 (e.g., smartphone 900) includes: a display screen 910, an image capturing device 920 (e.g., a video camera), and a processor 930.

Display screen 910 is configured to project (e.g., display) projection information. The projection information comprises content displayed by a display screen, and the projection information is updated by updating the display content of the display screen. Image capturing device 920 (e.g., a video camera) is configured to capture a first image of the current target object after the projection information is projected onto the target object by the display screen, and, after the projection information is modified, capture a second image of the target object with the projection updated. Processor 930 is configured to obtain image data for the first image, image data for the second image, image variation results from different areas in the first image and the second image and to compare the first image and the second image, and to obtain image difference data between the different areas of the first image and the second image (e.g., image variation results of the different areas), and to use the image difference data as a basis for determining whether the target object is a virtual object.

In some embodiments, the smartphone shown in FIG. 9 described above has a touch display device (also called a "touchscreen" or a "touch display screen"). In some embodiments, the smartphone shown in FIG. 9 described above has a graphical user interface (GUI). The user may engage in human-machine interaction with the GUI by finger contact and/or gestures touching the touch-sensitive surface. The human-machine interaction function here optionally includes the following interactions: creating a web page, drawing, text processing, producing an electronic document, gaming, videoconferencing, instant messaging, receiving/sending e-mail, calling interface, playing digital video, playing digital audio, and/or Internet browsing, etc. The executable instructions for executing the human-machine interaction functions described above are configured/stored in computer program products executable by one or more processors or in readable storage media.

Specifically, in the embodiment described above, the display screen can be the display screen of a smartphone capable of displaying certain electronic information content onto the screen and is a display tool for reflecting such information onto the human eye. The image capturing device or video camera can be a smartphone video camera. After images are captured through a lens, a light-sensing component circuit and control component internal to the video device process and convert the images to digital signals recognizable by a terminal device. Then, after the digital signals are input into the terminal device via a wireless (e.g., Bluetooth, WiFi, infrared, etc.) connection or a wired (e.g., a parallel port, USB, micro USB, fire wire, etc.) connection, the image is restored by software. The processor can be the CPU of a smartphone that has an image processing function. The projection information can be content (which can be pictures, text, or forms) displayed on the display screen. The target object can be any object for which image information needs to be acquired through a video camera. In an optional embodiment, the target object can be the face of a person, and the virtual object can be a two-dimensional image or a three-dimensional model of the target object.

In some embodiments, the virtual object can be a photograph of the target object or a three-dimensional model (such as a wax likeness), a video, slides of consecutive pictures, or images synthesized from photograph-based software simulations and containing actions.

In taking a target object that is a human eye as an example, there is a very large difference between the feedback of the human eye to changes in the display content of a display screen and the feedback of pictures, video, or simulation software to changes in the display content of a display screen. Feedback can correspond to information derived from a reflection from the target object of content displayed from the display screen. Therefore, the feedback data for a target object can be used as a basis for assessing whether the current target is a true human face or contains a virtual human face (e.g., including a photograph or a video of a human face).

According to various embodiments, when projection information is projected onto a target object (e.g., via display of the projection information from a display of the terminal), a first image obtained from the current capturing of the target object is acquired. After the projection information is modified, a second image obtained from capturing the target object is acquired when updated projection information is being projected. The first image and the second image are compared, and image difference data is obtained. For example, the image difference data can correspond to a difference between the first image and the second image. The image difference can be a measure of an extent to which the second image differs from the first image. In some embodiments, the image difference data indicates whether the second image comprises updated content corresponding to a modification to projection information displayed by the terminal, or the image difference data includes information from which an indication of whether the second image comprises updated content corresponding to a modification to projection information displayed by the terminal is derived. The image difference data serves as a basis for determining whether the target object is a virtual object.

In some embodiments modifying the content currently projected onto the target object (e.g., modifying the projection information) comprises modifying the content displayed on a display screen or the screen parameters of the display screen and project the modification results onto the target object. Then, an image capturing device (e.g., a video camera, a front camera on a terminal, etc.) is used to obtain a first image and a second image of the target object before and after the data (e.g., the content displayed on the display screen) is changed for projecting onto the target object. The image difference data of the first image and the second image serves as a basis for determining whether the current target object is a virtual object. For example, image difference data corresponding to a difference between the first image and the second image is used in connection with determining whether the target object is a virtual object. Changing the content projected onto the target object will change the content shot during the process of capturing the target object. Content that can be used in a malicious or fraudulent authentication attempt (such as prerecording video of corresponding actions, showing slides of consecutive pictures, images of actions such as head-nodding or shaking or eye-blinking synthesized through computer simulations) employed by attackers is generally two-dimensional images. Therefore, when the projection information projected onto the two-dimensional image is modified, there will be no difference between the change results for any two areas within the two-dimensional images. For example, image difference data corresponding to images captured in the event that the target object is a virtual object (e.g., a prerecording video of corresponding actions, showing slides of consecutive pictures, images of actions such as head-nodding or shaking or eye-blinking synthesized through computer simulations) will indicate that the first image and the second image match. According to various embodiments, it is possible in the process of determining whether a target object is a virtual object to use image difference data to determine whether the target object is also a two-dimensional image (i.e., a virtual object). In some embodiments, it is possible to determine, after dynamically or periodically testing the modified projection information (e.g., obtaining corresponding images before and after modifying projection information), the following: if there exists a difference between the image variation results of different areas in the first image and the second image that were captured, determining that the target object is not a virtual object, but rather a living entity object. For example, various embodiments provide living-thing detection based on real-time feedback of the target object to display changes and thus improve live human-face detection accuracy and reduce malicious or fraudulent attempts for authentication by virtual objects on authentication systems.

Various embodiments improve on existing live recognition-based authentication systems that are vulnerable to video or image attacks, in which malicious users make use of the simulated actions of legitimate users by employing live actions to implement recognition.

In some embodiments, when terminal 900 activates an authentication function, terminal 900 can activate the processor 930 to determine whether the target object is a virtual object.

In some embodiments, the first image comprises at least: a first facial image and a first background image of the target object when projecting the first projection information; and the second image comprises at least: a second facial image and a second background image of the target object when projecting the second projection information. The projection information comprises at least one of the following: projection brightness, projection color, and projection graphics or text.

In some embodiments, processor 930 is configured to determine that the target object is a virtual object if the image difference data is null. The image difference data being null can represent the fact that the image data of the first image and of the second image are the same.

In some embodiments, image difference data includes: a first degree of variation from comparing the first facial image to the second facial image, and a second degree of variation from comparing the first background image to the second background image. Processor 930 can be further configured to determine, when the projection information is projection brightness and/or projection color, that the target object is a virtual object if the first degree of variation is the brightness variation value and/or the color variation value of the entire face, and if the difference between the first degree of variation and the second degree of variation falls within a first predetermined range of variation. If the projection information projected onto the target object is modified, the first degree of variation is determined by recording the facial image obtained by capturing the target object, and the second degree of variation is determined by capturing the background image in which the target object is located.

Various embodiments use partial brightness variation of images as a basis for determining whether a target object is a virtual object. Because the brightness of a display screen varies, the degrees of brightness variation of the face portion and the background portion in picture brightness acquired by a video camera in real time will have the following differences: the brightness variation of the face portion of a real person will be more apparent because a distance of the face portion of the real person from the display screen will not be the same, but the brightness variation of the background portion will not be as readily apparent. In the event that the target object corresponds to pictures, video, software simulation, and other such methods, the distances from the display screen of the face portion and the background portion will be basically dissimilar, but the degree of brightness variation will be the same.

In some embodiments, image difference data includes: a first degree of variation from comparing the first facial image to the second facial image and a second degree of variation from comparing the first background image to the second background image. In the event that the first facial image and the second facial image include characteristic information on at least one biological characteristic of the target object face, and in the event that the projection information is projection brightness and/or projection color, processor 930 can determine that the target object is a virtual object if the first degree of variation is the brightness variation value and/or the color variation value of any one or more biological characteristics of the face, and the difference between the first degree of variation and the second degree of variation falls within a second predetermined range of variation. If the projection information projected onto the target object is modified, the first degree of variation is determined by recording the facial image obtained by capturing the target object, and the second degree of variation is determined by capturing the background image in which the target object is located.

Various embodiments determine whether a target object is a virtual object based on the degree of brightness variation of the various parts of a face. As the brightness and/or color of the display screen varies, a difference in the degree of brightness and/or color between the face portion and the background portion in the brightness of a picture acquired in real time by a video camera exists. In the case of a real person, the brightness variation between high-intensity light portions and low-intensity light portions of the face will be dissimilar because of the face's 3D structure. In the case of a picture, video, software simulation, or other such method, the brightness variation pattern of the various portions of the face will differ from that of a real person because of its flat structure.

In some embodiments, the image difference data includes: in the event that there is an image variation value for at least one biological characteristic in a first facial image and a second facial image, and in the event that the projection information is projection brightness and/or projection color, processor 930 is configured to obtain the brightness variation values and/or color variation values of any two biological characteristics. If the image variation values of any two or more biological characteristics fall within a third predetermined variation range, then the target object is determined to be a virtual object. If the projection information projected onto the target object is modified, the image difference data is determined by recording the characteristic image obtained from capturing at least one biological characteristic of the target object face.

In some embodiments, the projection information comprises: projection graphics. In the event that the biological characteristic is an eyeball, the image difference data is the image variation value of the biological characteristic in the first facial image and the second facial image, which is the variation value of the image content reflected by the eyeball. Processor 930 can be further configured to determine that the target object is a virtual object if the variation value of the image content lies within a predetermined variation range (e.g., a fourth predetermined variation range).

In some embodiments, taking the example of a person's face as the target object, the content (such as text or pictures) displayed by a smartphone display screen can modified to obtain corresponding projection information, which is projected onto the face. Then, the person's eyeball will reflect the content currently displayed by the phone display screen. Therefore, the information reflected by the person's eyeball will not be the same before and after the content displayed by the smartphone display screen has changed. Thus, the first image and the second image of the face shot by the smartphone's video camera before and after the phone changes the content will be different. If the target object is the photograph of a face or is another two-dimensional or three-dimensional model, the first and second images of the face shot by the smartphone's video camera before and after the phone changes the content will generally be the same. Various embodiments improve the security of a living-thing recognition-based authentication system.

Various embodiments provide a computer terminal. This computer terminal can be any computer terminal device within a cluster of computer terminals. The computer terminal can also be replaced with a terminal device such as a mobile terminal.

In some embodiments, the computer is located on any one network device among multiple network devices of a computer network.

According to various embodiments, the computer terminal can execute program code for the following steps of a vulnerability detection method of an application: when projection information is projected onto a target object, a first image obtained from the current capturing of the target object is acquired. After the projection information is modified, a second image obtained from capturing the target object when the projection information has undergone projection updating is acquired. The first image and the second image are compared, and image difference data is acquired. The image difference data serves as a basis for determining whether the target object is a virtual object.

Figure 10:
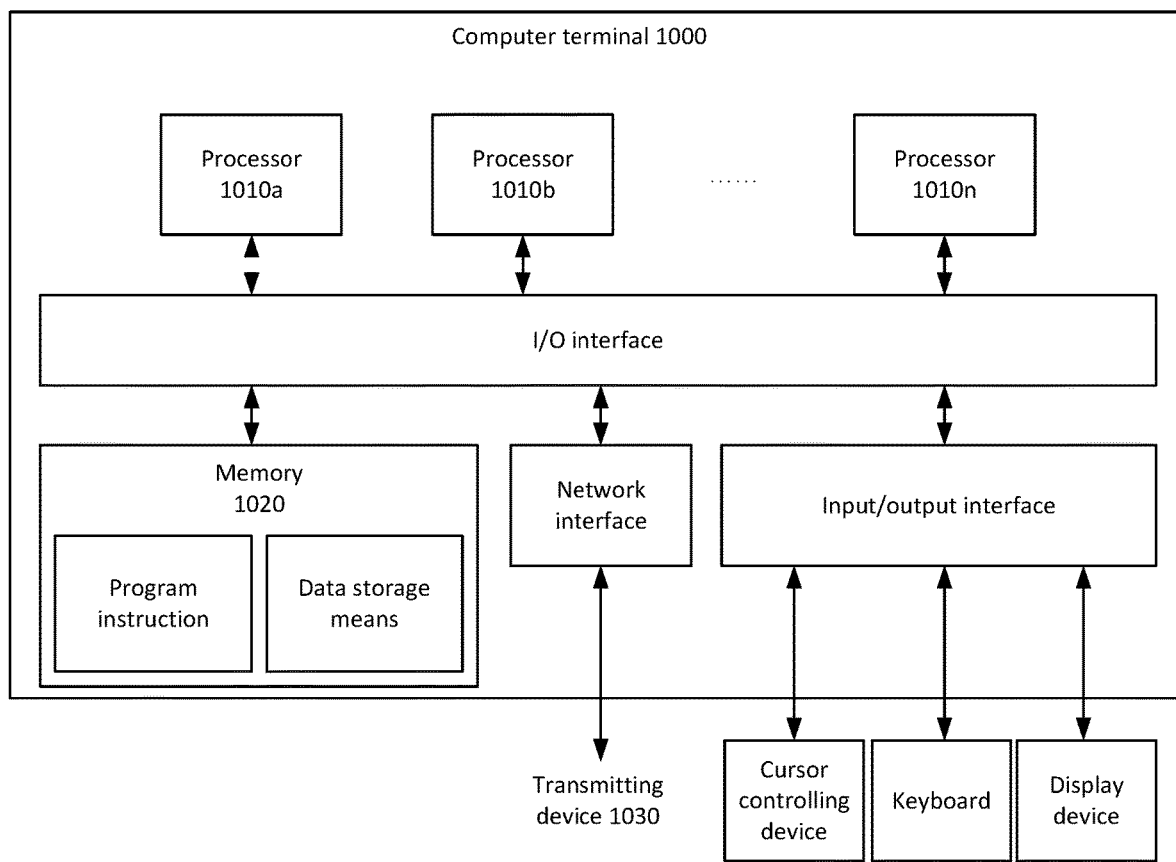
FIG. 10 is a structural block diagram of a computer terminal according to various embodiments of the present application.

FIG. 10 is a structural block diagram of a computer terminal according to various embodiments of the present application.

Referring to FIG. 10, terminal 1000 for facial recognition-based authentication is provided. Terminal 1000 can be implemented in connection with terminal 100 of FIG. 1, terminal 200 of FIG. 2, system 300 of FIG. 3, and/or smartphone 900 of FIG. 9. Terminal 1000 can implement, at least in part, process 400 of FIG. 4, process 600 of FIG. 6, process 700 of FIG. 7, and/or process 800 of FIG. 8.

As shown in FIG. 10, the computer terminal 1000 comprises one or more processors 1010 (e.g., processor 1010a, processor 1010b, and/or processor 1010n), memory 1020, and communication module (e.g., transmitting device) 1030.

Memory 1020 can be used to store software programs and modules, e.g., program instruction/modules corresponding to a security vulnerability detection method. By running software programs and modules stored in the memory, processor 1010 executes various function apps and data processing (e.g., processor 1010) implements the method for detecting system vulnerability to attack. Memory 1020 can comprise high-speed random access memory. Memory 1020 can further comprise non-volatile memory, such as one or more magnetic storage devices, flash memory, or other non-volatile solid-state memory. In some embodiments, memory 1020 comprises memory that is remotely disposed relative to the processor. Such remote memory may be connected to the terminal 1000 via a network. Examples of the network comprise, but are not limited to, the Internet, corporate intranets, local area networks, mobile communication networks, and combinations thereof.

Processor 1010 can invoke information and applications stored by memory 1020 to execute the steps below: when projection information is projected onto a target object, a first image obtained from the current capturing of the target object is acquired. After the projection information is modified, a second image obtained from capturing the target object when the projection information has undergone projection updating is acquired. The first image and the second image are compared, and image difference data is acquired. The image difference data serves as a basis for determining whether the target object is a virtual object. Processor 1010 can invoke the information and applications stored by memory 1020 using the input/output interface, or the transmitting device 1030.

Processor 1010 can further execute program code for the steps below: when a terminal device activates an authentication function, the projection information is projected by the display screen of the terminal device, wherein the projection information is content displayed by the display screen and the projection information is updated by updating the display content of the display screen.

In some embodiments, a first image comprises at least: a first facial image and a first background image of the target object when projecting the first projection information; and a second image comprises at least: a second facial image and a second background image of the target object when projecting the second projection information. The projection information can comprise at least one of the following: projection brightness, projection color, and projection graphics.

In some embodiments, processor 1010 executes program code for the steps below: if the image difference data is null, determine that the target object is a virtual object. The image difference data being null represents the fact that the image data of the first image and of the second image are the same.

In some embodiments, processor 1010 executes program code for the steps below: when the projection information is projection brightness and/or projection color, if the first degree of variation is the brightness variation value and/or the color variation value of the entire face, and the difference between the first degree of variation and the second degree of variation falls within a first predetermined range of variation, then the target object is determined to be a virtual object. If the projection information projected onto the target object is modified, the first degree of variation is determined by recording the facial image obtained by capturing the target object, and the second degree of variation is determined by capturing the background image in which the target object is located.

In some embodiments, processor 1010 executes program code for the steps below: when the projection information is projection brightness and/or projection color, if the first degree of variation is the brightness variation value and/or the color variation value of any one or more biological characteristics of the face, and the difference between the first degree of variation and the second degree of variation falls within a threshold range (e.g., a second predetermined range of variation), then the target object is determined to be a virtual object. If the projection information projected onto the target object is modified, the first degree of variation is determined by recording the facial image obtained by capturing the target object, and the second degree of variation is determined by capturing the background image in which the target object is located.

In some embodiments, processor 1010 executes program code for the steps below: when the projection information is projection brightness and/or projection color, acquiring the brightness variation values and/or color variation values of any two biological characteristics. If the image variation values of any two or more biological characteristics fall within a third predetermined variation range, then the determination is made that the target object is a virtual object. If the projection information projected onto the target object is modified, the image difference data is determined by recording the characteristic image obtained from capturing at least one biological characteristic of the target object face.

In some embodiments, processor 1010 executes program code for the steps below: the projection information comprises: projection graphics. When the biological characteristic is an eyeball, the image difference data is the image variation value of the biological characteristic in the first facial image and the second facial image, which is the variation value of the image content reflected by the eyeball. If the variation value of the image content lies within a fourth predetermined variation range, then the determination is made that the target object is a virtual object.

The structure shown in FIG. 10 is merely illustrative. The computer terminal may be a smartphone (such as an Android phone or an iOS phone), a tablet computer, a palmtop computer, a mobile Internet device (MID), a PAD, or other such device. FIG. 10 does not limit the structures of the electronic devices. For example, the computer terminal 1000 may further comprise more or fewer components (such as network interfaces, display devices, etc.) than shown in FIG. 10 or may have a configuration that differs from the one shown in FIG. 10.

A person with ordinary skill in the art may understand that all or some of the steps in the various methods of the embodiments described above can be carried out by instructing terminal device-related hardware via programs. These programs may be stored in computer-readable storage media. The storage media may include: flash disks, read-only memory (ROM), random access memory (RAM), magnetic disks, optical disks, etc.

Various embodiments provide a storage medium. In some embodiments, the storage medium is used to save the program code executed by a facial recognition-based authentication method.

The storage medium can be located in any computer terminal in a computer terminal group in a computer network or located in any mobile terminal in a mobile terminal group.

In some embodiments, the storage medium is configured to store program code for executing the following steps: when projection information is projected onto a target object, a first image obtained from the current capturing of the target object is acquired. After the projection information is modified, a second image obtained from capturing the target object when the projection information has undergone projection updating is acquired. The first image and the second image are compared, and image difference data is acquired. The image difference data serves as a basis for determining whether the target object is a virtual object.

In some embodiments, the storage medium is configured to store program code for executing the following steps: when a terminal device activates an authentication function, the projection information is projected by the display screen of the terminal device. The projection information can be content displayed by the display screen and the projection information is updated by updating the display content of the display screen.

In some embodiments, a first image comprises at least: a first facial image and a first background image of the target object when projecting the first projection information; and a second image comprises at least: a second facial image and a second background image of the target object when projecting the second projection information. The projection information can comprise one or more of the following: projection brightness, projection color, and projection graphics.

In some embodiments, the storage medium is configured to store program code for executing the following steps: if the image difference data is null, determine that the target object is a virtual object. The image difference data being null can represent the fact that the image data of the first image and of the second image are the same.

In some embodiments, the storage medium is configured to store program code for executing the following steps: when the projection information is projection brightness and/or projection color, if the first degree of variation is the brightness variation value and/or the color variation value of the entire face, and the difference between the first degree of variation and the second degree of variation falls within a first predetermined range of variation, then the target object is determined to be a virtual object. If the projection information projected onto the target object is modified, the first degree of variation is determined by recording the facial image obtained by capturing the target object, and the second degree of variation is determined by capturing the background image in which the target object is located.

In some embodiments, the storage medium is configured to store program code for executing the following steps: when the projection information is projection brightness and/or projection color, if the first degree of variation is the brightness variation value and/or the color variation value of any one or more biological characteristics of the face, and the difference between the first degree of variation and the second degree of variation falls within a second predetermined range of variation, then the target object is determined to be a virtual object. If the projection information projected onto the target object is modified, the first degree of variation is determined by recording the facial image obtained by capturing the target object, and the second degree of variation is determined by capturing the background image in which the target object is located.

In some embodiments, the storage medium is configured to store program code for executing the following steps: when the projection information is projection brightness and/or projection color, acquire the brightness variation values and/or color variation values of any two biological characteristics. If the image variation values of any two or more biological characteristics fall within a threshold range (e.g., a third predetermined variation range), then the target object is determined to be a virtual object. If the projection information projected onto the target object is modified, the image difference data is determined by recording the characteristic image obtained from capturing at least one biological characteristic of the target object face.

In some embodiments, the storage medium is configured to store program code for executing the following steps: the projection information comprises: projection graphics. When the biological characteristic is an eyeball, the image difference data is the image variation value of the biological characteristic in the first facial image and the second facial image, which is the variation value of the image content reflected by the eyeball. If the variation value of the image content lies within a threshold range (e.g., a fourth predetermined variation range), then the target object is determined to be a virtual object.

In the embodiments of the present invention, the description of each embodiment has its respective emphasis, and parts of the embodiments are not described in detail. One may refer to other embodiments for the relevant descriptions.

Please understand that, in several embodiments provided by the present application, the disclosed technical content may be realized in other ways. The device embodiments described above are merely illustrative. For example, the division into said units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, units, or modules. They may be electrical or may take another form.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The integrated units may also take the form of hardware, and they may take the form of software function units.

If said integrated units are realized in the form of software functional units and are sold or used as separate products, they may be stored on computer-readable storage media. Based on such an understanding, the technical scheme of various embodiments, whether intrinsically or with respect to portions that contribute to the prior art, or with respect to all or part of the technical scheme, is realizable in the form of software products. These computer software products can be stored on storage media (such as ROM/RAM, magnetic disks, and optical disks) and include a certain number of commands used to cause a piece of terminal equipment (which can be a mobile phone, a computer, a server, or network equipment) to execute the methods described in the embodiments of the present invention. The storage medium described above encompasses: USB flash drive, mobile hard drive, read-only memory (ROM), random access memory (RAM), portable hard drives, magnetic disks, or optical disks, or various other media that can store program code.

The description above is only a specific means of implementing various embodiments. It should be pointed out that persons with ordinary skill in the art can, without departing from the principles of the present invention, also produce a number of improvements and embellishments, and that such improvements and embellishments should also be regarded as falling within the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
a display screen configured to make a projection onto a target object according to projection information, wherein the projection information comprises display content displayed by the display screen or parameter information of the display screen, and wherein the projection information is updated based at least in part on updating the display content or the parameter information of the display screen;
an image capturing device configured to capture a first image of the target object after the projection information has been projected onto the target object, and to capture a second image of the target object after the projection information is updated; and
one or more processors configured to obtain image difference data based at least in part on the first image and the second image, and to determine whether the target object is a virtual object based at least in part on the image difference data, wherein the image difference data corresponds to an image artifact that is indicative of an update to the projection information, the update being based on the updating of the display content or the parameter information of the display screen, the image artifact being based at least in part on a reflection of the update corresponding to the second image.

2. The device of claim 1, wherein the one or more processors obtain the image difference data based at least in part on a comparison of the first image and the second image.

3. The device of claim 2, wherein the one or more processors are further configured to obtain image data corresponding to the first image and image data corresponding to the second image, and to compare the image data corresponding to the first image and the image data corresponding to the second image.

4. The device of claim 3, wherein the image difference data corresponds to a result of the comparing of the image data corresponding to the first image and the image data corresponding to the second image.

5. The device of claim 1, wherein the one or more processors determine whether the target object is the virtual object and determine whether an authentication of a user associated with the target object is successful.

6. A system, comprising:
a display device configured to make a projection onto a target object according to projection information, wherein the projection information comprises display content displayed by the display device or parameter information of the display device, and the projection information is updated based at least in part on updating the display content or the parameter information of the display device;
an image capturing device configured to communicate with the display device to capture a first image of the target object after the projection information has been projected onto the target object, and to capture a second image of the target object after the projection information is updated; and a computer terminal configured to obtain image difference data based at least in part on the first image and the second image, and to determine whether the target object is a virtual object based at least in part on the image difference data, wherein the image difference data corresponds to an image artifact that is indicative of an update to the projection information, the update being based on the updating of the display content or the parameter information of the display device, the image artifact being based at least in part on a reflection of the update corresponding to the second image.

7. A method, comprising:

obtaining a first image of a target object;

updating projection information associated with a display by a display device;

obtaining a second image of the target object, the second image being an image of the target object after the projection information is updated;

obtaining an image difference data based at least in part on the first image and the second image, wherein the image difference data corresponds to an image artifact that is indicative of an update to the projection information, the update being based on the updating of the display content or the parameter information of the display device, the image artifact being based at least in part on a reflection of the update corresponding to the second image; and determining whether the target object is a virtual object based at least in part on the image difference data.

8. The method of claim 7, wherein the obtaining the image difference data comprises determining the image difference data based at least in part on the first image and the second image.

9. The method of claim 8, further comprising: obtaining image data corresponding to the first image and image data corresponding to the second image.

10. The method of claim 9, wherein the obtaining of the image difference data comprises comparing the image data corresponding to the first image and the image data corresponding to the second image.

11. The method of claim 10, wherein the image difference data corresponds to a result of the comparing of the image data corresponding to the first image and the image data corresponding to the second image.

12. The method of claim 7, wherein the target object is determined to be the virtual object in the event the first image and the second image match.

13. The method of claim 7, wherein the target object is determined to be a real object in the event that the first image and the second image do not match.

14. The method of claim 7, further comprising: authenticating a user based at least in part on whether the target object is determined to be the virtual object.

15. The method of claim 7, wherein the projection information is projected by a display screen of the display device, and the projection information comprises content displayed by said display screen, and the projection information is updated based at least in part on updating the display content of the display screen.

16. The method of claim 7, wherein:

the first image comprises a first facial image and a first background image of the target object captured when first projection information is being projected;

the second image comprises a second facial image and a second background image of the target object captured when second projection information is being projected; and the projection information comprises one or more of: projection brightness, projection color, and projection graphics.

17. The method of claim 9, wherein determining whether the target object is the virtual object based at least in part on the image difference data comprises:

determining that the target object is the virtual object response to a determination that the image difference data is null, wherein the image difference data being null represents the image data of the first image and the image data of the second image being the same.

18. The method of claim 16, wherein:

the image difference data comprises: a first degree of variation based at least in part on comparing the first facial image to the second facial image, and a second degree of variation based at least in part on comparing the first background image to the second background image; and the determining whether the target object is the virtual object based at least in part on the image difference data comprises:

determining the projection information corresponds to one or more of the projection brightness and the projection color;

determining that a difference between the first degree of variation and the second degree of variation is within a predetermined range, wherein the first degree of variation corresponds to one or more of a brightness variation value and a color variation value of a face in the first facial image and the second facial image; and determining that the target object is the virtual object in the event that the projection information corresponds to one or more of the projection brightness and the projection color and in the event that the difference between the first degree of variation and the second degree of variation is within the predetermined range.

19. The method of claim 18, wherein in the event that the projection information projected onto the target object is modified, determining the first degree of variation by recording a facial image obtained by capturing the target object and determining the second degree of variation based at least in part on capturing a background image associated with the target object.

20. The method of claim 16, wherein:

the image difference data comprises: a first degree of variation based at least in part on comparing the first facial image to the second facial image, and a second degree of variation based at least in part on comparing the first background image to the second background image;

the first facial image and the second facial image comprising characteristic information for at least one biological characteristic of a face of the target object; and the determining of whether the target object is the virtual object based at least in part on the image difference data comprises:

determining the projection information corresponds to one or more of the projection brightness and the projection color;

determining that a difference between the first degree of variation and the second degree of variation is within a threshold range, wherein the first degree of variation corresponds to one or more of a brightness variation value and a color variation value of any one or more biological characteristics of a face in the first facial image and the second facial image; and determining that the target object is the virtual object in the event that the first degree of variation corresponds to one or more of the brightness variation value and the color variation value of any one or more of the biological characteristics of the face in the first facial image and the second facial image, and the difference between the first degree of variation and the second degree of variation is within the threshold range, determining that the target object is the virtual object.

21. The method of claim 20, wherein in response to the projection information projected onto the target object having been modified, determining the first degree of variation by recording a facial image obtained by capturing the target object and determining the second degree of variation based at least in part on capturing a background image associated with the target object.

22. The method of claim 16, wherein:
the projection information comprises: projection graphics; and
in response to a determination that the biological characteristic includes a characteristic of an eyeball, the image difference data comprises an image variation value of biological characteristics in the first facial image and the second facial image, wherein the image variation value comprises a variation value of image content reflected by the eyeball, and in response to the variation value of the image content being within a threshold range, determining that the target object is the virtual object.

23. The method claim 16, wherein:
the image difference data comprises a image variation value of at least one biological characteristic in the first facial image and the second facial image;
the determining whether the target object is the virtual object based at least in part on the image difference data comprises:

in the event that the projection information corresponds to one or more of the projection brightness and the projection color, obtaining one or more of a brightness variation value and a color variation value of any two or more biological characteristics; and determining that the target object is the virtual object if the image variation value of each of the any two or more biological characteristics is within a threshold range; and modifying the projection information associated with a projection onto said target object, including determining the image difference data by recording a characteristic image obtained from capturing at least one biological characteristic of a target object face.

24. The method of claim 7, further comprising: in response to a modification of the projection information associated with a projection onto the target object, determining the image difference data based at least in part on recording a characteristic image obtained from capturing at least one biological characteristic of a face of the target object.

25. The method of claim 7, wherein the image difference data comprises information indicative of a difference between one or more characteristics of the projection information and one or more characteristics of updated projection information that is displayed based on the updating of the projection information.

26. The method of claim 7, further comprising:
in determining that the target object is not the virtual object, performing an authentication of a user.

27. The method of claim 7, wherein the image artifact is caused by a change in a brightness of the display device, a change in color projected by the display device, or a change in the display content and reflected by an eye of a user captured in the second image.

28. The method claim 7, wherein the image difference data based at least in part on a difference between the first image and the second image.

* * * * *